US008395810B2

(12) United States Patent
Kanai

(10) Patent No.: US 8,395,810 B2
(45) Date of Patent: Mar. 12, 2013

(54) IMAGE FORMING APPARATUS, INFORMATION PROCESSING APPARATUS, AND IMAGE FORMING SYSTEM

(75) Inventor: Kunio Kanai, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1137 days.

(21) Appl. No.: 11/723,004

(22) Filed: Mar. 15, 2007

(65) Prior Publication Data

US 2007/0229872 A1 Oct. 4, 2007

(30) Foreign Application Priority Data

Mar. 31, 2006 (JP) ................................. 2006-100675

(51) Int. Cl.
*H04N 1/60* (2006.01)
(52) U.S. Cl. ........ 358/1.9; 358/1.13; 358/1.15; 358/2.1; 358/518
(58) Field of Classification Search ........................ None
See application file for complete search history.

(56) References Cited

U.S. PATENT DOCUMENTS

| | | | | | |
|---|---|---|---|---|---|
| 5,646,670 | A | * | 7/1997 | Seto et al. ...................... | 347/131 |
| 5,844,689 | A | * | 12/1998 | Kawase ........................ | 358/296 |
| 6,058,207 | A | * | 5/2000 | Tuijn et al. .................... | 382/162 |
| 6,816,179 | B2 | * | 11/2004 | Hanyu .......................... | 347/131 |
| 6,947,158 | B1 | * | 9/2005 | Kitamura et al. ............. | 358/1.15 |
| 7,036,907 | B2 | * | 5/2006 | Jung et al. ...................... | 347/43 |
| 7,145,692 | B2 | * | 12/2006 | Simpson et al. .............. | 358/1.9 |
| 7,298,522 | B2 | * | 11/2007 | Sugimoto ...................... | 358/1.3 |
| 7,337,399 | B2 | * | 2/2008 | Jensen et al. ................... | 715/255 |
| 7,398,029 | B2 | * | 7/2008 | Jacobsen et al. ............... | 399/79 |
| 7,715,051 | B2 | * | 5/2010 | Tomaru .......................... | 358/2.1 |
| 7,804,629 | B2 | * | 9/2010 | Jacobs et al. ................... | 358/504 |
| 7,944,594 | B2 | * | 5/2011 | Ito et al. ......................... | 358/518 |
| 2003/0147089 | A1 | * | 8/2003 | Simpson et al. ............... | 358/1.9 |
| 2004/0223174 | A1 | * | 11/2004 | Mikami ......................... | 358/1.9 |
| 2005/0018230 | A1 | * | 1/2005 | Green et al. .................. | 358/1.13 |
| 2005/0105136 | A1 | * | 5/2005 | Jung .............................. | 358/3.1 |
| 2006/0066925 | A1 | * | 3/2006 | Hasegawa et al. ............ | 358/518 |
| 2006/0072135 | A1 | * | 4/2006 | Umezawa et al. .............. | 358/1.9 |
| 2006/0098220 | A1 | * | 5/2006 | Oh et al. ........................ | 358/1.9 |
| 2007/0003306 | A1 | * | 1/2007 | Jacobsen et al. ............... | 399/79 |
| 2007/0153308 | A1 | * | 7/2007 | Zemach et al. ................ | 358/1.9 |
| 2008/0175641 | A1 | * | 7/2008 | Harris et al. .................... | 400/62 |
| 2010/0128287 | A1 | * | 5/2010 | Harris et al. ................... | 358/1.2 |

FOREIGN PATENT DOCUMENTS

| | | |
|---|---|---|
| JP | 2002-067446 A | 3/2002 |
| JP | 2002-211048 | 7/2002 |
| JP | 2004-157904 A | 6/2004 |
| JP | 2004-167755 A | 6/2004 |

* cited by examiner

*Primary Examiner* — Dung Tran
(74) *Attorney, Agent, or Firm* — Kubotera & Associates, LLC

(57) ABSTRACT

An image forming system includes an information processing apparatus and an image forming apparatus. The information processing apparatus includes a conversion information forming unit for creating object specifying information and object conversion information; a conversion information combining unit for creating combined print data; and a transmission unit for transmitting the combined print data to the image forming apparatus. The image forming apparatus includes a reception unit for receiving the combined print data; an information obtaining unit for obtaining the object specifying information and the object conversion information; a conversion unit for converting the combined print data to create converted print data according to the object specifying information and the object conversion information thus obtained; and a printing unit for performing a printing operation according to the converted print data.

11 Claims, 21 Drawing Sheets

```
%% Example

%% - Defines

/box
{
100 rlineto 0 10 rlineto - 100 rlineto closepath
} def

%% - Data newpath
60 80 moveto box        ⎫
0.5 setgray             ⎬ 72
fill                    ⎭ newpath
20 60 moveto box        ⎫
0.5 setgray             ⎬ 73
fill                    ⎭ newpath
60 30 100 360 arcn
closepath
001 setrgbcolor
fill

/Arial findfont
10 scalefont
setfont newpath
20 100 moveto
(AAAA) show newpath
40 70 moveto            ⎫
 0.5 setgray            ⎬ 74
(BBBBBBB) show          ⎭ showpage

Density reduction conversion

IMAGE FORMING APPARATUS, INFORMATION PROCESSING APPARATUS, AND IMAGE FORMING SYSTEM

BACKGROUND OF THE INVENTION

The present invention relates to an image forming apparatus, an information processing apparatus, and an image forming system.

In a conventional image forming system, when an image forming apparatus receives print data including a drawing object such as a text, a graphic, an image, and the likes from a host device, the image forming apparatus performs a printing operation according to the print data. In a conventional image forming system disclosed in Patent Reference, when print data received from a host device includes a drawing object having color information other than monochrome, an image forming apparatus performs a color printing operation. When print data does not include a drawing object having color information other than monochrome, the image forming apparatus performs a monochrome printing operation.
Patent Reference: Japanese Patent Publication No. 2002-211048

In the conventional image forming system, there are the following problems. That is, even in a case that there is no information difference if the image forming apparatus performs the monochrome printing operation, when the print data includes a drawing object having color information other than monochrome, the image forming apparatus performs a color printing operation. Accordingly, in this case, color toner is wasted.

In view of the problems described above, an object of the present invention is to provide an image forming apparatus, an information processing apparatus, and an image forming system capable of solving the problems of the conventional image forming system.

Further objects and advantages of the invention will be apparent from the following description of the invention.

SUMMARY OF THE INVENTION

In order to attain the objects described above, according to a first aspect of the present invention, an image forming system comprises an information processing apparatus for creating print data including a drawing object and an image forming apparatus for receiving the print data from the information processing apparatus.

In the first aspect of the present invention, the information processing apparatus comprises a conversion information forming unit for creating object specifying information indicating a drawing object specified as a conversion subject, and for creating object conversion information to direct reducing consumption of color toner relative to the drawing object thus specified; a conversion information combining unit for creating combined print data through adding the object specifying information and the object conversion information to the print data; and a transmission unit for transmitting the combined print data to the image forming apparatus.

In the first aspect of the present invention, the image forming apparatus comprises a reception unit for receiving the combined print data from the transmission unit; an information obtaining unit for obtaining the object specifying information and the object conversion information from the combined print data thus received; a conversion unit for converting the combined print data to create converted print data according to the object specifying information and the object conversion information thus obtained; and a printing unit for performing a printing operation according to the converted print data thus created.

According to a second aspect of the present invention, an image forming apparatus comprises a reception unit for receiving object specifying information indicating a drawing object specified as a conversion subject, object conversion information indicating contents of a conversion command relative to the drawing object thus specified to reduce consumption of color toner, and print data from a host device; an information obtaining unit for obtaining the object specifying information and the object conversion information; a conversion unit for converting the print data to create converted print data according to the object specifying information and the object conversion information thus obtained; and a printing unit for performing a printing operation according to the converted print data thus created.

According to a third aspect of the present invention, an information processing apparatus comprises a specifying unit for specifying a drawing object to be converted; a conversion information forming unit for creating object specifying information indicating the drawing object specified as a conversion subject, and for creating object conversion information indicating contents of a conversion command relative to the drawing object thus specified; a conversion information combining unit for creating combined print data through adding the object specifying information and the object conversion information to the print data; and a transmission unit for transmitting the combined print data to the image forming apparatus.

In the present invention, in a case that there is no information difference if a graphic and the likes to be printed in colors are printed in monochrome, it is possible to perform the printing operation with reduced color toner consumption, thereby conserving color toner.

BRIEF DESCRIPTION OF THE DRAWINGS

FIG. 9 is a schematic view showing an example No. 1 of converted print data;

DETAILED DESCRIPTION OF THE PREFERRED EMBODIMENTS

Hereunder, embodiments of the present invention will be explained with reference to the accompanying drawings.

First Embodiment

Figure 1:
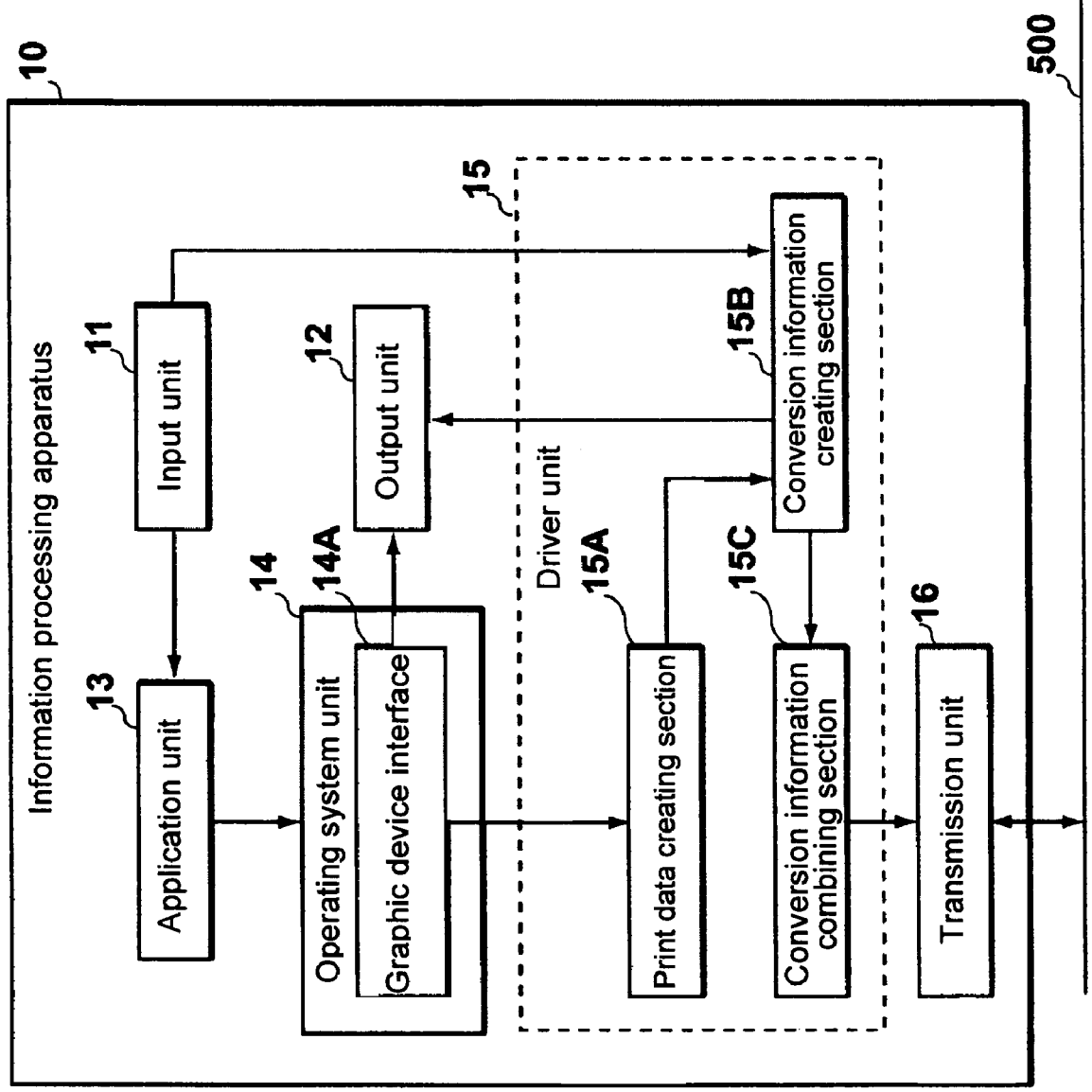
FIG. 1 is a block diagram showing a configuration of an image forming system according to a first embodiment of the present invention.

A first embodiment of the present invention will be explained. FIG. 1 is a block diagram showing a configuration of an image forming system according to the first embodiment of the present invention.

As shown in FIG. 1, the image forming system includes an information processing apparatus 10; a network 500 (I/F cable); and an image forming apparatus 20. The information processing apparatus 10 is connected to the image forming apparatus 20 through the network 500 (I/F cable).

In the embodiment, the information processing apparatus 10 includes a PC (Personal Computer) and the likes, and is formed of an input unit 11 such as a keyboard, a mouse, and the likes; an output unit 12 such as a liquid crystal display and the likes; an application unit 13; an operating system unit 14; a driver unit 15; and a transmission unit 16.

In the embodiment, the application unit 13 creates drawing object data including a text, a graphic, an image, and the likes according to an operation of a user similar to, for example, a word processor. Further, the application unit 13 performs a print command of the drawing object data thus created. When the application unit 13 receives the print command of the drawing object data from the input unit 11, the application unit 13 transfers the drawing object data to the operating system unit 14.

Figure 2:
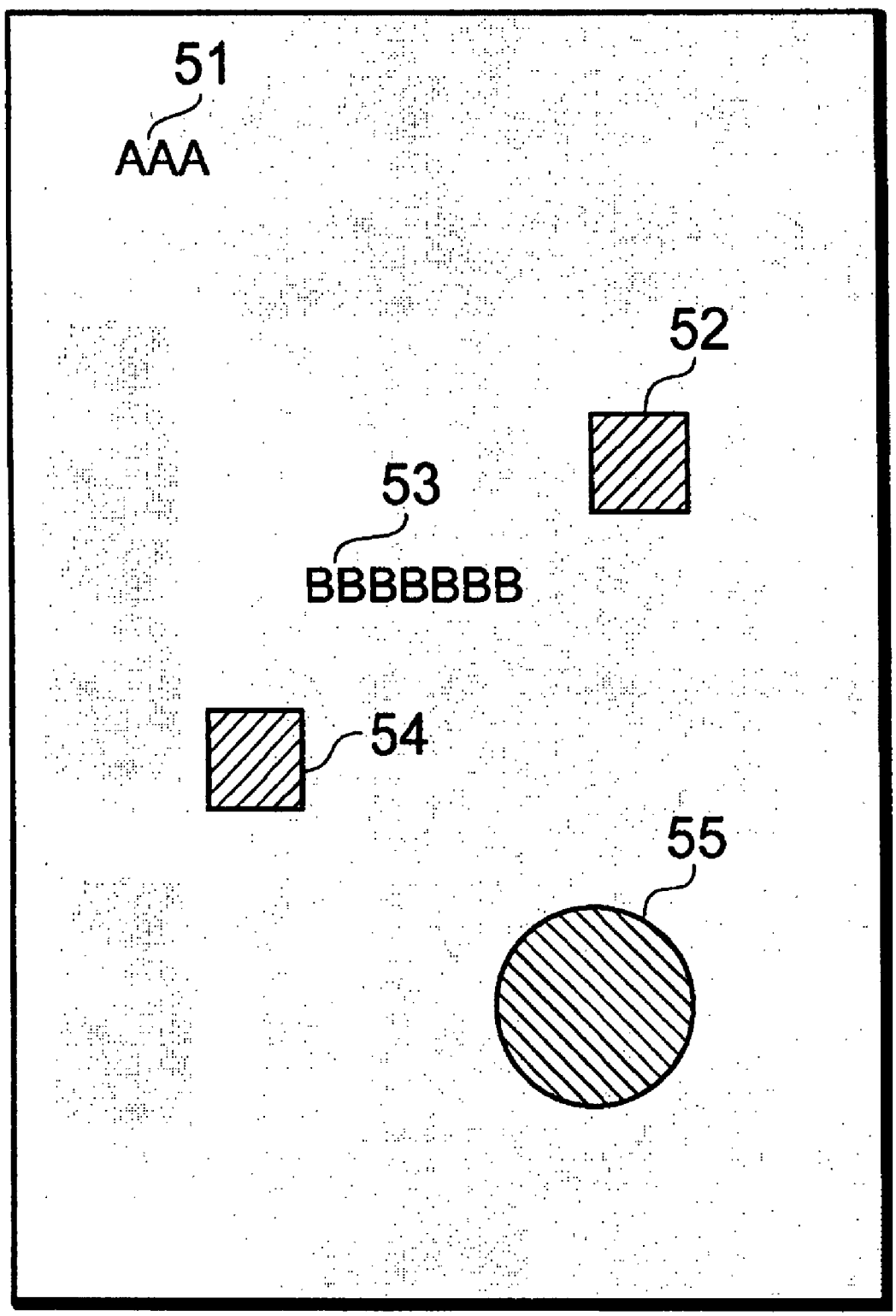
FIG. 2 is a schematic view showing an example of drawing object data.

FIG. 2 is a schematic view showing an example of the drawing object data. As shown in FIG. 2, the drawing object data includes drawing objects 51 to 55, and the drawing object data is transferred to the operating system unit 14.

In the embodiment, the operating system unit 14 controls the input unit 11, the output unit 12, the application unit 13, the driver unit 15, and the likes. The operating system unit 14 includes a graphic device interface 14A. The graphic device interface 14A transfers the drawing object data to one of the driver unit 15 and the output unit 12. When the graphic device interface 14A receives the drawing object data, the graphic device interface 14A transfers the drawing object data to the driver unit 15.

In the embodiment, the driver unit 15 creates print data to be transmitted to the image forming apparatus 20. The driver unit 15 includes a print data creating section 15A, a conversion information creating section 15B, and a conversion information combining section 15C. The print data creating section 15A creates the print data according to the drawing object data. When the print data creating section 15A receives the drawing object data, the print data creating section 15A creates the print data to be transmitted to the image forming apparatus 20 according to PDL (Page-Description Language).

Figure 3:
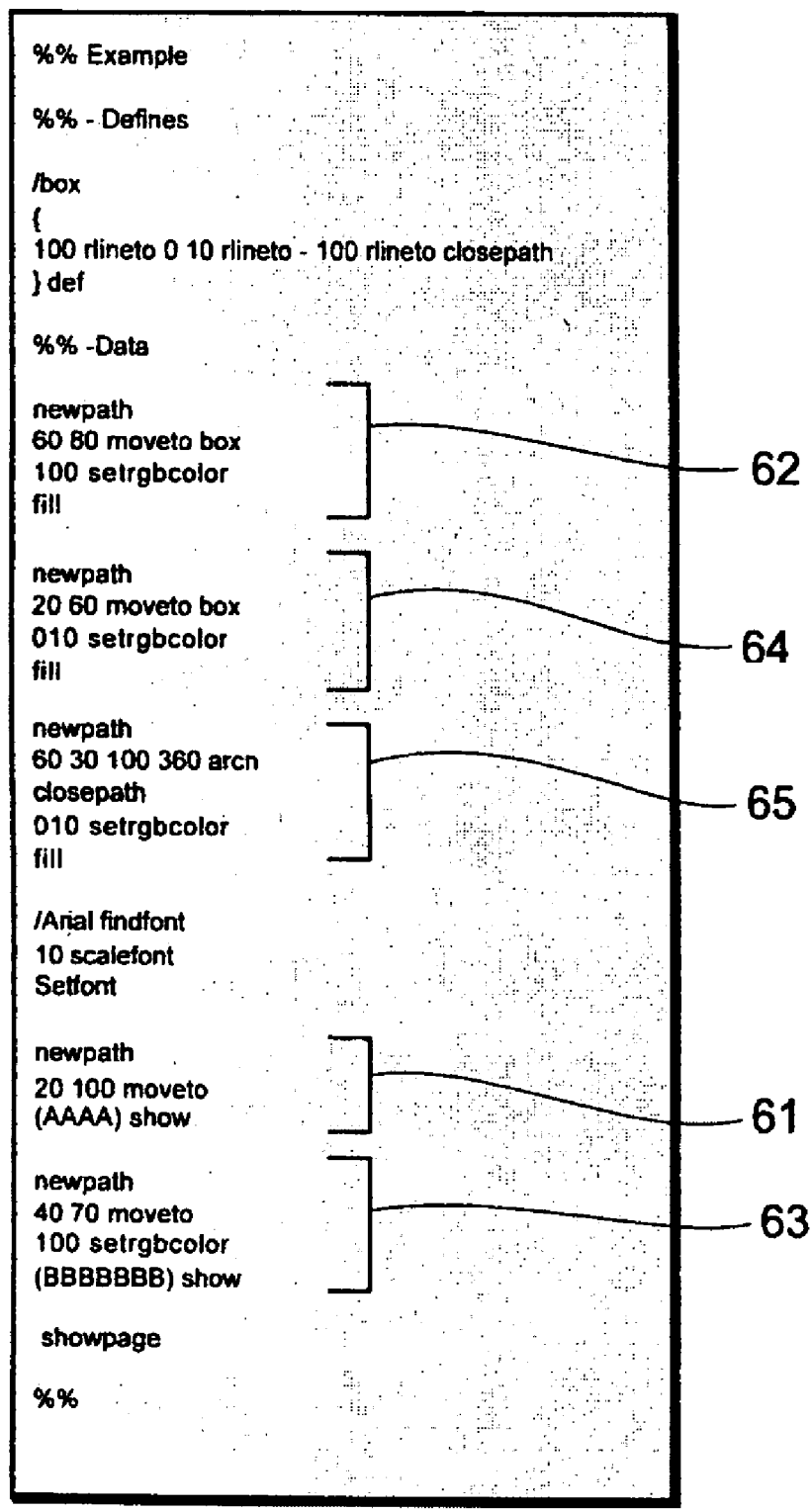
FIG. 3 is a schematic view showing an example of print data.

FIG. 3 is a schematic view showing an example of the print data thus created according to the drawing object data (FIG. 2). As shown in FIG. 3, the print data includes PDLs 61 to 65 corresponding to the drawing objects 51 to 55, respectively.

In the embodiment, the conversion information creating section 15B directs conversion of the drawing object described in PDL, and includes a memory (not shown) holding conversion setting screen data for conversion setting.

When the print data creating section 15A creates the print data, the conversion information creating section 15B temporarily stores the print data in a memory (not shown). Further, the conversion information creating section 15B creates print image data for displaying a preview per page according to the print data thus created. Then, the conversion information creating section 15B transfers the print image data of a first page and the conversion setting screen data in the memory to the output unit 12. At this moment, the conversion information creating section 15B temporarily stores the print image data of pages other than the first page in a memory (not shown).

Figure 4:
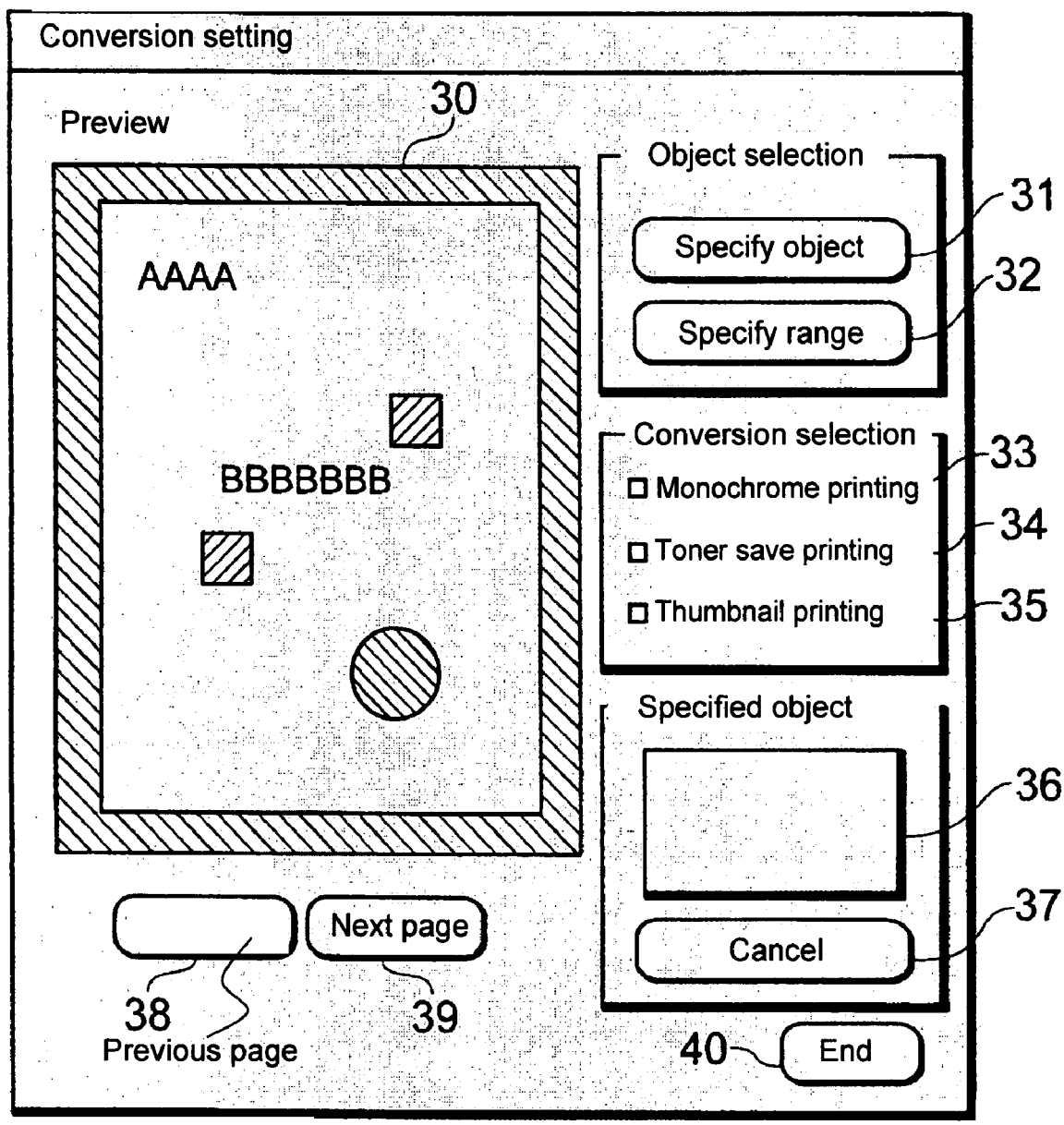
FIG. 4 is a schematic view showing an example No. 1 of a conversion setting screen.

When the output unit 12 receives the print image data and the conversion setting screen data, the output unit 12 displays a conversion setting screen. FIG. 4 is a schematic view showing an example No. 1 of the conversion setting screen.

As shown in FIG. 4, the conversion setting screen has a preview displaying area 30; a specified object displaying area 36; a previous page button 38; a next page button 39; an object specifying button 31; a range specifying button 32; a monochrome printing check box 33; a toner save printing check box 34; a thumbnail printing check box 35; a cancel button 37; and an end button 40. A preview screen is displayed in the preview displaying area 30 according to the print image data thus received.

In the embodiment, the object specifying button 31 is used for specifying the drawing object to be converted individually. The range specifying button 32 is used for specifying several drawing objects to be converted in a group. The monochrome printing check box 33, the toner save printing check box 34, and the thumbnail printing check box 35 are used for directing reduction in consumption of color toner with respect to the drawing object thus specified. The cancel button 37 is used for canceling the drawing object already specified, and the end button 40 is used for completing the conversion setting.

In the embodiment, the previous page button 38 and the next page button 39 are used for updating the preview screen. When a user looks at the conversion setting screen and pushes the next page button 39 through the input unit 11, the conversion information creating section 15B retrieves from the memory the print image data representing the preview screen of the next page relative to the preview screen currently displayed, and transfers the print image data to the output unit 12. The output unit 12 displays the conversion setting screen thus updated in the preview screen according to the print image data and the conversion setting screen data thus received.

When the user looks at the conversion setting screen and pushes the previous page button 38 through the input unit 11, the conversion information creating section 15B retrieves from the memory the print image data representing the preview screen of the previous page relative to the preview screen currently displayed, and transfers the print image data to the output unit 12. The output unit 12 displays the conversion setting screen thus updated in the preview screen according to the print image data and the conversion setting screen data thus received.

An operation of the conversion information creating section 15B will be explained next, in which the conversion information creating section 15B specifies object specifying information indicating the drawing object specified by the user and object conversion information indicating the conversion command of the drawing object.

First, the user looks at the conversion setting screen and pushes the object specifying button 31 through the input unit 11 to specify the drawing object in the preview displaying area 30. In the next step, when the user checks the monochrome printing check box 33, the conversion information creating section 15B transfers the object specifying information indicating the drawing object thus specified and the object conversion information directing monochrome conversion with respect to the drawing object to the conversion information combining section 15C.

Alternatively, when the user checks the toner save printing check box 34, the conversion information creating section 15B transfers the object specifying information and the object conversion information directing density reduction conversion with respect to the drawing object to conserve toner to the conversion information combining section 15C. Further, when the user checks the thumbnail printing check box 35, the conversion information creating section 15B transfers the object specifying information and the object conversion information directing reduction conversion with respect to the drawing object to the conversion information combining section 15C.

In this step, the conversion information creating section 15B creates the print image data for displaying the preview screen to distinctively display the drawing object, in which, for example, the drawing object thus specified is depicted with a broken line. Further, the conversion information creating section 15B creates specified object data indicating that the drawing object thus specified is already specified, and transfers the print image data and the specified object data to the output unit 12.

Figure 5:
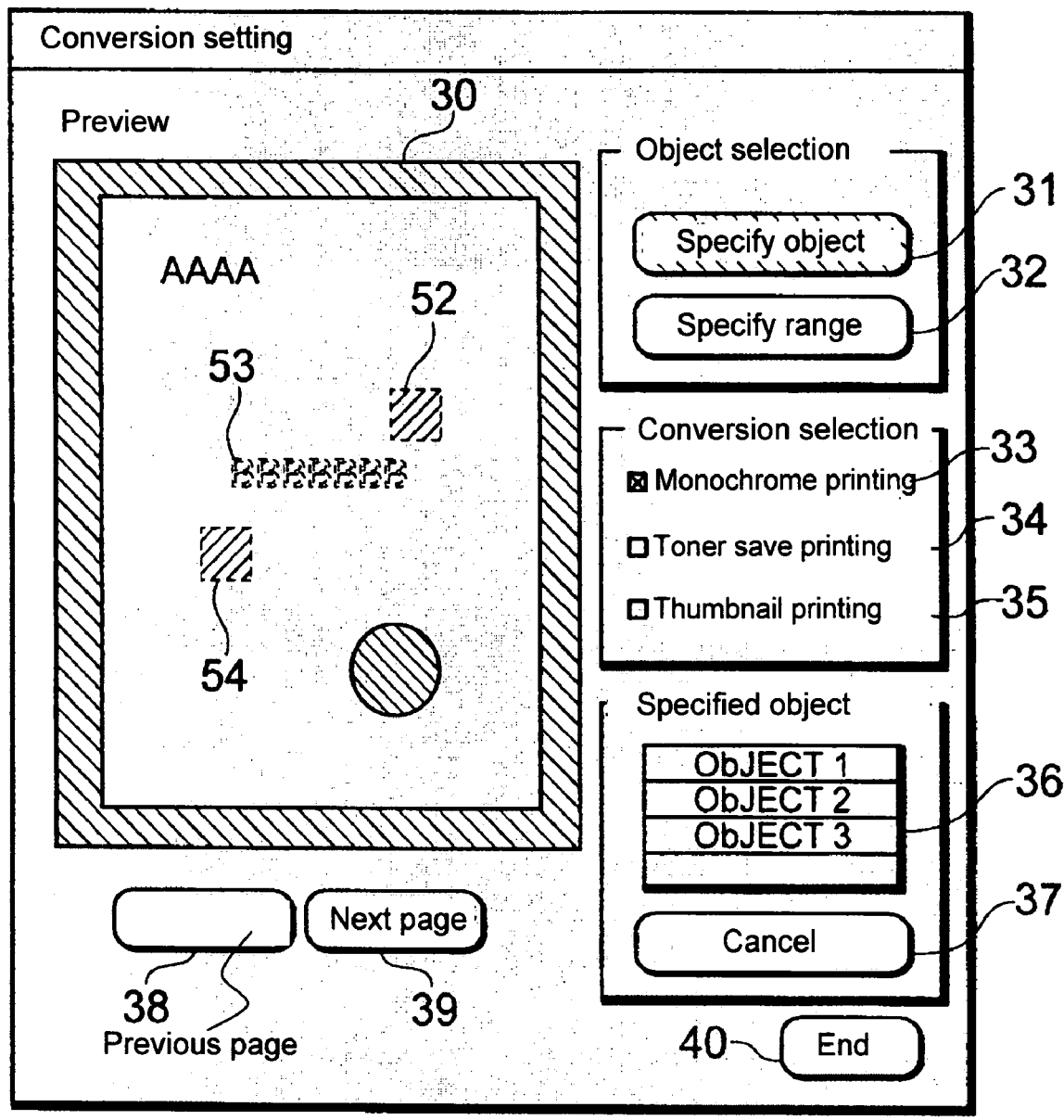
FIG. 5 is a schematic view showing an example No. 2 of the conversion setting screen.

When the output unit 12 receives the print image data and the specified object data, the output unit 12 updates the conversion setting screen according to the print image data and the specified object data. That is, the drawing object is distinctively depicted in the preview displaying area 30, and is displayed in the specified object displaying area 36 so that the drawing object can be selected. FIG. 5 is a schematic view showing an example No. 2 of the conversion setting screen. As shown in FIG. 5, the drawing objects 52 to 54 are displayed as the specified object data.

When the user looks at the conversion setting screen and pushes the range specifying button 32, a range of the drawing objects in the preview displaying area 30 is specified. In the next step, when the user checks the monochrome printing check box 33, the conversion information creating section 15B transfers the object specifying information indicating the drawing objects in the range thus specified and the object conversion information directing the monochrome conversion with respect to the drawing objects in the range thus specified to the conversion information combining section 15C.

Alternatively, when the user checks the toner save printing check box 34, the conversion information creating section 15B transfers the object specifying information and the object conversion information directing the density reduction conversion with respect to the drawing objects in the range thus specified to conserve toner to the conversion information combining section 15C. Further, when the user checks the thumbnail printing check box 35, the conversion information creating section 15B transfers the object specifying information and the object conversion information directing the reduction conversion with respect to the drawing objects in the range thus specified to the conversion information combining section 15C.

In this step, the conversion information creating section 15B creates the print image data for displaying the preview screen to distinctively display the drawing objects in the range thus specified, in which, for example, the drawing objects are depicted with broken lines. Further, the conversion information creating section 15B creates the specified object data indicating that the drawing objects in the range thus specified are already specified, and transfers the print image data and the specified object data to the output unit 12.

Figure 6:
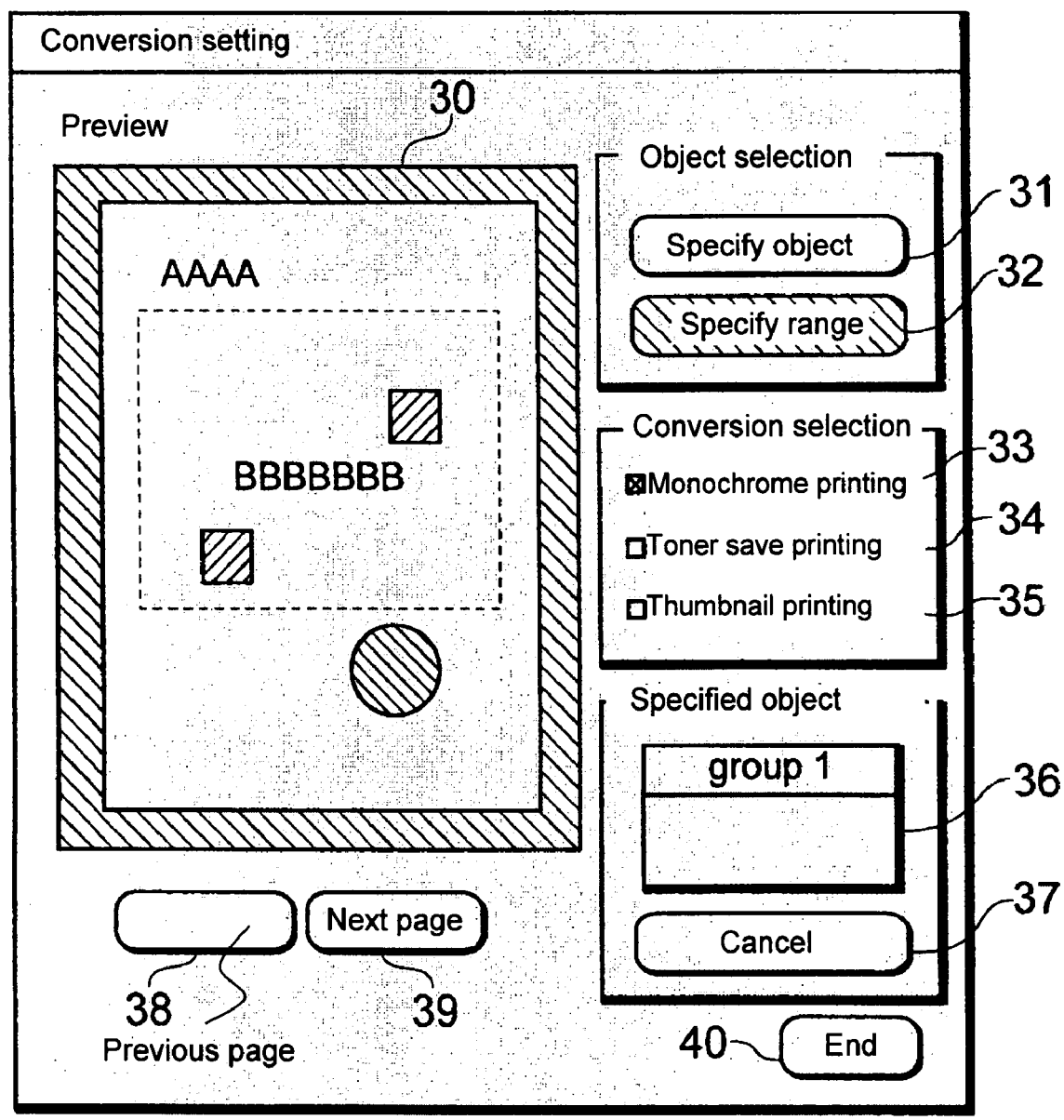
FIG. 6 is a schematic view showing an example No. 3 of the conversion setting screen.

When the output unit 12 receives the print image data and the specified object data, the output unit 12 updates the conversion setting screen according to the print image data and the specified object data. That is, the drawing objects in the range thus specified are distinctively depicted in the preview displaying area 30, and are displayed in the specified object displaying area 36 so that the drawing objects can be selected. FIG. 6 is a schematic view showing an example No. 3 of the conversion setting screen. As shown in FIG. 6, the drawing objects 52 to 54 in the range thus specified are displayed.

In the embodiment, the conversion information combining section 15C adds the object specifying information and the object conversion information thus received to the print data. That is, every time when the conversion information combining section 15C receives the object specifying information and the object conversion information, the conversion information combining section 15C adds the object specifying information and the object conversion information thus received to the print data in the memory (not shown), thereby creating combined print data.

An operation of canceling the drawing object will be explained next.

When the user specifies the drawing object in the specified object displaying area 36 through the input unit 11 and pushes the cancel button 37, the conversion information creating section 15B deletes the object specifying information indicating the drawing object thus specified and the object conversion information with respect to the drawing object from the combined print data. Further, the conversion information creating section 15B creates the print image data in which the distinct display of the drawing object is removed, and transfers the print image data thus created to the output unit 12. Upon receiving the print image data, the output unit 12 displays the conversion setting screen in which the distinct display of the drawing object is removed according to the print image data thus received.

An operation of completing the conversion setting will be explained next.

When the user pushes the end button 40 through the input unit 11, the conversion information creating section 15B detects that the conversion setting is completed. Then, the conversion information creating section 15B transfers the print data in the memory to the transmission unit 16, and sends a completion command signal to the output unit 12, so that the conversion setting screen is terminated. Upon receiving the completion command signal, the output unit 12 stops displaying the conversion setting screen.

As described above, while the user looks at the conversion setting screen, it is possible to easily specify and convert the drawing object individually or the drawing objects in the range through pushing the object specifying button 31 or the range specifying button 32. Further, the drawing object thus specified is distinctively displayed, thereby making it possible to confirm the drawing object thus specified. Further, since the drawing object is displayed in the specified object displaying area 36, it is possible to easily select and cancel the drawing object.

Figure 7:
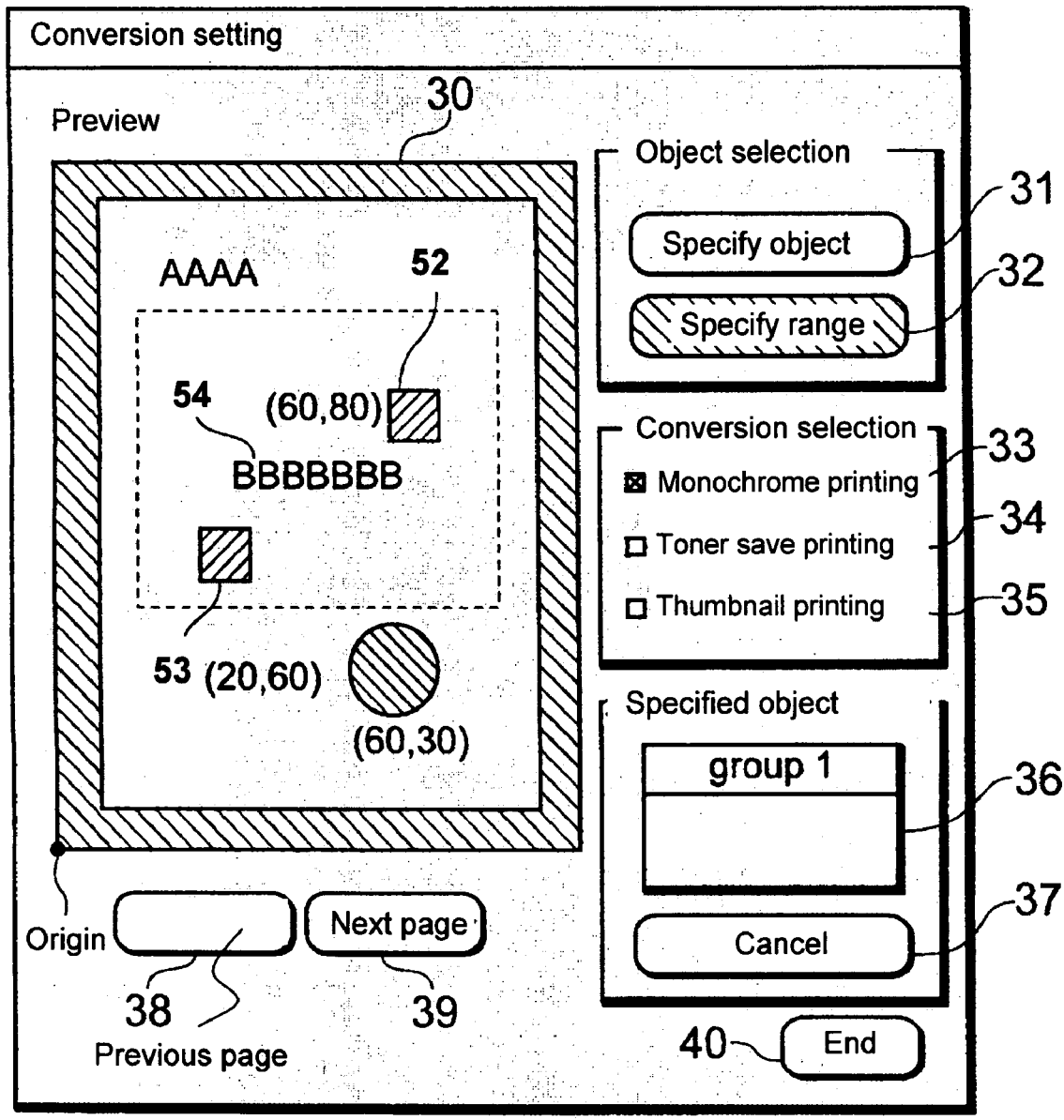
FIG. 7 is a schematic view showing an example No. 4 of the conversion setting screen.

FIG. 7 is a schematic view showing an example No. 4 of the conversion setting screen. As shown in FIG. 7, drawing objects 52 to 53 are specified in a range, and the monochrome printing check box 33 is checked. Accordingly, the conversion information creating section 15B transfers the combined print data having object specifying information 72 to 74 and object conversion information 71 to the transmission unit 16.

In the embodiment, when the transmission unit 16 receives the combined print data, the transmission unit 16 sends the combined print data to the image forming apparatus 20. The image forming apparatus 20 includes a printer and the likes for performing the printing operation according to the print data, and includes a reception unit 21; a conversion unit 22; and a printing unit 23.

In the embodiment, when the reception unit 21 receives the combined print data from the information processing apparatus 10, the reception unit 21 transfers the combined print data to the conversion unit 22. When the conversion unit 22 receives the combined print data, the conversion unit 22 performs a conversion process of the combined print data to create converted print data according to the object specifying information and the object conversion information added to the combined print data, and transfers the converted print data to the printing unit 23.

More specifically, the conversion unit 22 analyzes the combined print data to determine whether the object conversion information is added to the combined print data. When the conversion unit 22 determines that the object conversion information is not added, the conversion unit 22 determines the completion of the conversion process, and transfers the converted print data to the printing unit 23.

When the conversion unit 22 determines that the object conversion information is added, the conversion unit 22 analyzes the combined print data to determine whether the object specifying information of the drawing object to be converted is added to the combined print data. When the conversion unit 22 determines that the object specifying information is not added, the conversion unit 22 deletes the object conversion information from the combined print data. Then, the conversion unit 22 continues analyzing the combined print data to determine whether the object specifying information of other drawing object to be converted is added to the combined print data.

When the conversion unit 22 determines that the object specifying information of the drawing object to be converted is added to the combined print data, the conversion unit 22 performs the conversion process on PDL of the drawing object indicated by the object specifying information according to the object conversion information. Further, the conversion unit 22 deletes the object specifying information of the drawing object thus converted from the combined print data.

The conversion unit 22 repeats the process described above until the object specifying information of the drawing object to be converted no longer exists. When it is determined that the object specifying information of the drawing object to be converted no longer exists, the conversion unit 22 deletes the object conversion information. Further, the conversion unit 22 analyzes the combined print data to determine whether the object conversion information of other drawing object is added to the combined print data.

Figure 8:
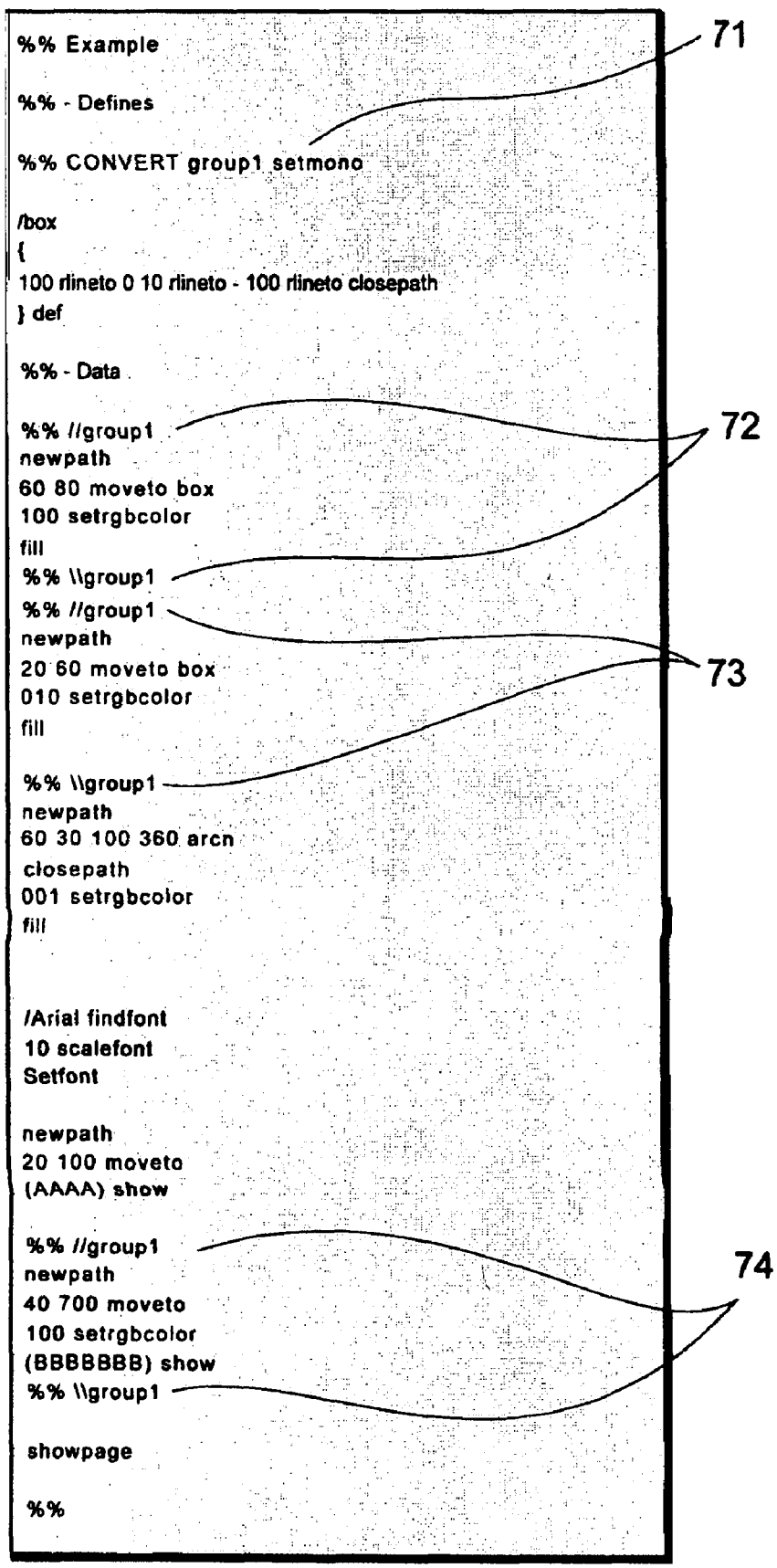
FIG. 8 is a schematic view showing an example No. 1 of combined print data.

FIG. 8 is a schematic view showing an example No. 1 of the combined print data. As shown in FIG. 8, the combined print data includes the object specifying information 72 to 74 and the object conversion information 71 directing the monochrome conversion. As described above, the combined print data shown in FIG. 8 is transferred to the transmission unit 16. As a result, the converted print data shown in FIG. 9 is transferred to the printing unit 23. In the converted print data, PDLs of the drawing objects indicated by the object specifying information 72 to 74 are processed through the monochrome conversion.

Figure 10:
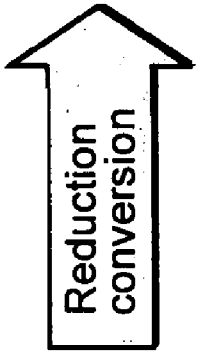
FIG. 10(a) is a schematic view showing an example No. 2 of the combined print data.
FIG. 10(b) is a schematic view showing an example No. 2 of the converted print data.

FIG. 10(*a*) is a schematic view showing an example No. 2 of the combined print data. As shown in FIG. 10(*a*), the object specifying information 72 and the object conversion information 75 directing the toner save printing are added to the combined print data. In this case, PDL of the drawing object indicated by the object specifying information 72 is processed through the density reduction conversion, and the converted print data shown in FIG. 10(*b*) is created. FIG. 10(*b*) is a schematic view showing an example No. 2 of the converted print data. Then, the converted print data is transferred to the printing unit 23.

Figure 11:
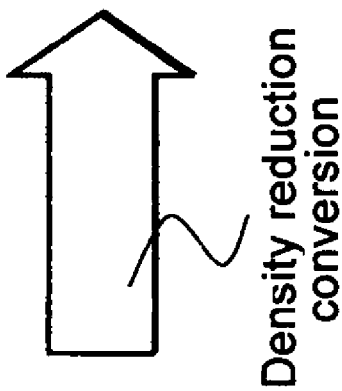
FIG. 11(a) is a schematic view showing an example No. 3 of the combined print data.
FIG. 11(b) is a schematic view showing an example No. 3 of the converted print data.

FIG. 11(*a*) is a schematic view showing an example No. 3 of the combined print data. As shown in FIG. 11(*a*), the object specifying information 72 and the object conversion information 76 directing the thumbnail printing are added to the combined print data. In this case, PDL of the drawing object indicated by the object specifying information 72 is processed through the reduction conversion, and the converted print data shown in FIG. 11(*b*) is created. FIG. 11(*b*) is a schematic view showing an example No. 3 of the converted print data. Then, the converted print data is transferred to the printing unit 23.

In the embodiment, when the printing unit 23 receives the converted print data, the printing unit 23 performs the printing operation according to the converted print data.

As described above, in the embodiment, the drawing object is specified through the conversion setting screen, in which there is no information difference when the drawing object is printed in colors or in monochrome, from the drawing objects in the print data. Then, the converted print data, in which the drawing object thus specified is processed through the monochrome conversion, is transferred to the printing unit 23, thereby performing the printing operation. Accordingly, it is possible to reduce color toner consumption.

Further, the drawing object is specified, in which there is no information difference when the drawing object is printed in colors in the toner save mode or the full color mode, from the drawing objects in the print data. Then, the converted print data, in which the drawing object thus specified is processed through the density reduction conversion, is transferred to the printing unit 23, thereby performing the printing operation. Accordingly, it is possible to reduce color toner consumption.

Further, the drawing object is specified, in which there is no information difference when the drawing object is printed with or without reducing the size of the drawing object, from the drawing objects in the print data. Then, the converted print data, in which the drawing object thus specified is processed through the reduction conversion, is transferred to the printing unit 23, thereby performing the printing operation, in which the drawing object is printed in the reduced size. Accordingly, it is possible to reduce color toner consumption.

Figure 12:
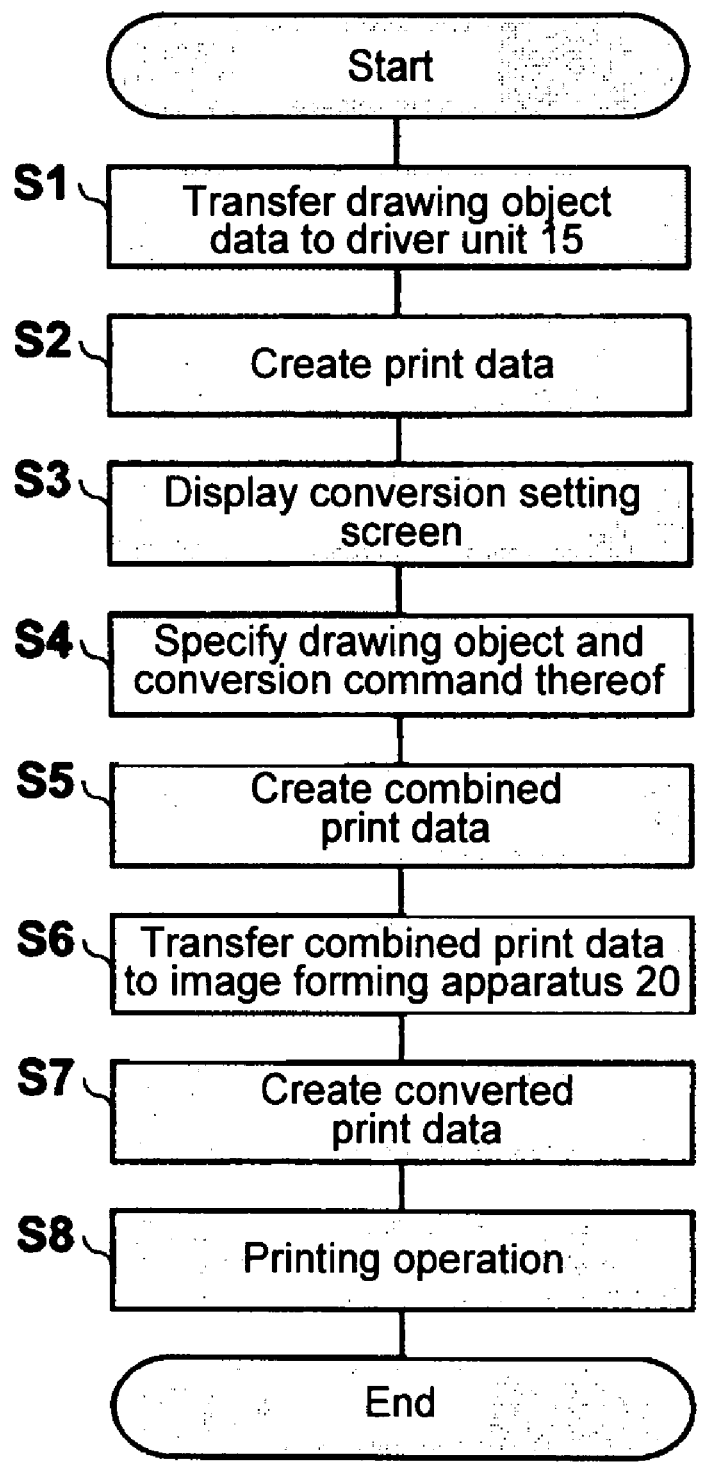
FIG. 12 is a flow chart showing an operation of an image forming system according to the first embodiment of the present invention.

An operation of the image forming system in the first embodiment will be explained next. FIG. 12 is a flow chart showing the operation of the image forming system according to the first embodiment of the present invention.

When the application unit 13 receives the print command of the drawing object data from the input unit 11, the application unit 13 transfers the drawing object data to the operating system unit 14. The drawing object data includes, for example, the drawing objects 52 to 55 shown in FIG. 2.

In step S1, when the graphic device interface 14A of the operation system unit 14 receives the drawing object data, the graphic device interface 14A transfers the drawing object data to the driver unit 15.

In step S2, when the print data creating section 15A receives the drawing object data, the print data creating section 15A creates the print data to be transmitted to the image forming apparatus 20 according to the drawing object data (FIG. 2) through PDL (Page-Description Language). As shown in FIG. 3, the drawing objects 52 to 55 are described with PDLs 61 to 65, respectively.

When the print data creating section 15A creates the print data, the conversion information creating section 15B temporarily stores the print data in the memory (not shown). Further, the conversion information creating section 15B creates the print image data for displaying the preview per page according to the print data thus created. Then, the conversion information creating section 15B transfers the print image data of the first page and the conversion setting screen data in the memory to the output unit 12. At this moment, the conversion information creating section 15B temporarily stores the print image data of the pages other than the first page in the memory (not shown).

In step S3, when the output unit 12 receives the print image data and the conversion setting screen data, the output unit 12 displays the conversion setting screen according to the print image data and the conversion setting screen data. Accordingly, the conversion setting screen shown in FIG. 4 is displayed.

In step S4, the user looks at the conversion setting screen and specifies the drawing object and the conversion command of the drawing object through the input unit 11.

The operation of the conversion information creating section 15B will be explained next. In the operation, the conversion information creating section 15B specifies the object specifying information indicating the drawing object specified by the user and the object conversion information indicating the conversion command of the drawing object.

First, the user looks at the conversion setting screen and pushes the object specifying button 31 through the input unit 11 to specify the drawing object in the preview displaying area 30. In the next step, when the user checks the monochrome printing check box 33, the conversion information creating section 15B transfers the object specifying information indicating the drawing object thus specified and the object conversion information directing the monochrome conversion with respect to the drawing object to the conversion information combining section 15C.

Alternatively, when the user checks the toner save printing check box 34, the conversion information creating section 15B transfers the object specifying information and the object conversion information directing the density reduction conversion with respect to the drawing object to conserve toner to the conversion information combining section 15C. Further, when the user checks the thumbnail printing check box 35, the conversion information creating section 15B transfers the object specifying information and the object conversion information directing the reduction conversion with respect to the drawing object to the conversion information combining section 15C.

In this step, the conversion information creating section 15B creates the print image data for displaying the preview screen to distinctively display the drawing object, in which, for example, the drawing object thus specified is depicted with a broken line. Further, the conversion information creating section 15B creates the specified object data indicating that the drawing object thus specified is already specified, and transfers the print image data and the specified object data to the output unit 12.

When the output unit 12 receives the print image data and the specified object data, the output unit 12 updates the conversion setting screen according to the print image data and the specified object data. That is, the drawing object is distinctively depicted in the preview displaying area 30, and is displayed in the specified object displaying area 36 so that the drawing object can be selected. As shown in FIG. 5, the drawing objects 52 to 54 are displayed as the specified object data.

When the user looks at the conversion setting screen and pushes the range specifying button 32, the range of the drawing objects in the preview displaying area 30 is specified. In the next step, when the user checks the monochrome printing check box 33, the conversion information creating section 15B transfers the object specifying information indicating the drawing objects in the range thus specified and the object conversion information directing the monochrome conversion with respect to the drawing objects in the range thus specified to the conversion information combining section 15C.

Alternatively, when the user checks the toner save printing check box 34, the conversion information creating section 15B transfers the object specifying information and the object conversion information directing the density reduction conversion with respect to the drawing objects in the range thus specified to conserve toner to the conversion information combining section 15C. Further, when the user checks the thumbnail printing check box 35, the conversion information creating section 15B transfers the object specifying information and the object conversion information directing the reduction conversion with respect to the drawing objects in the range thus specified to the conversion information combining section 15C.

In this step, the conversion information creating section 15B creates the print image data for displaying the preview screen to distinctively display the drawing objects in the range thus specified, in which, for example, the drawing objects are depicted with broken lines. Further, the conversion information creating section 15B creates the specified object data indicating that the drawing objects in the range thus specified are already specified, and transfers the print image data and the specified object data to the output unit 12.

When the output unit 12 receives the print image data and the specified object data, the output unit 12 updates the conversion setting screen according to the print image data and the specified object data. That is, the drawing objects in the range thus specified are distinctively depicted in the preview displaying area 30, and are displayed in the specified object displaying area 36 so that the drawing objects can be selected. As shown in FIG. 6, the drawing objects 52 to 54 in the range thus specified are displayed.

In step S5, every time when the conversion information combining section 15C receives the object specifying information and the object conversion information, the conversion information combining section 15C adds the object specifying information and the object conversion information thus received to the print data in the memory (not shown), thereby creating the combined print data.

The operation of canceling the drawing object is performed as follows.

When the user specifies the drawing object in the specified object displaying area 36 through the input unit 11 and pushes the cancel button 37, the conversion information creating section 15B deletes the object specifying information indicating the drawing object thus specified and the object conversion information with respect to the drawing object from the combined print data. Further, the conversion information creating section 15B creates the print image data in which the distinct display of the drawing object is removed, and transfers the print image data thus created to the output unit 12. Upon receiving the print image data, the output unit 12 displays the conversion setting screen in which the distinct display of the drawing object is removed according to the print image data thus received.

The operation of completing the conversion setting is performed as follows.

When the user pushes the end button 40 through the input unit 11, the conversion information creating section 15B detects that the conversion setting is completed. Then, the conversion information creating section 15B transfers the print data in the memory to the transmission unit 16, and sends the completion command signal the output unit 12, so that the conversion setting screen is terminated. Upon receiving the completion command signal, the output unit 12 stops displaying the conversion setting screen.

As described above, while the user looks at the conversion setting screen, it is possible to easily specify and convert the drawing object individually or the drawing objects in the range through pushing the object specifying button 31 or the range specifying button 32. Further, the drawing object thus specified is distinctively displayed, thereby making it possible to confirm the drawing object thus specified. Further, since the drawing object is displayed in the specified object displaying area 36, it is possible to easily select and cancel the drawing object.

As shown in FIG. 7, the drawing objects 52 to 53 are specified in the range, and the monochrome printing check box 33 is checked. Accordingly, the conversion information creating section 15B transfers the combined print data having the object specifying information 72 to 74 and the object conversion information 71 to the transmission unit 16 shown in FIG. 8.

In step S6, when the transmission unit 16 receives the combined print data, the transmission unit 16 sends the combined print data to the image forming apparatus 20. When the reception unit 21 of the image forming apparatus 20 receives the combined print data, the reception unit 21 transfers the combined print data to the conversion unit 22.

In step S7, when the conversion unit 22 receives the combined print data, the conversion unit 22 performs the conversion process of the combined print data to create the converted print data according to the object specifying information and the object conversion information added to the combined print data. In step S8, when the printing unit 23 receives the converted print data, the printing unit 23 performs the printing operation according to the converted print data.

Figure 13:
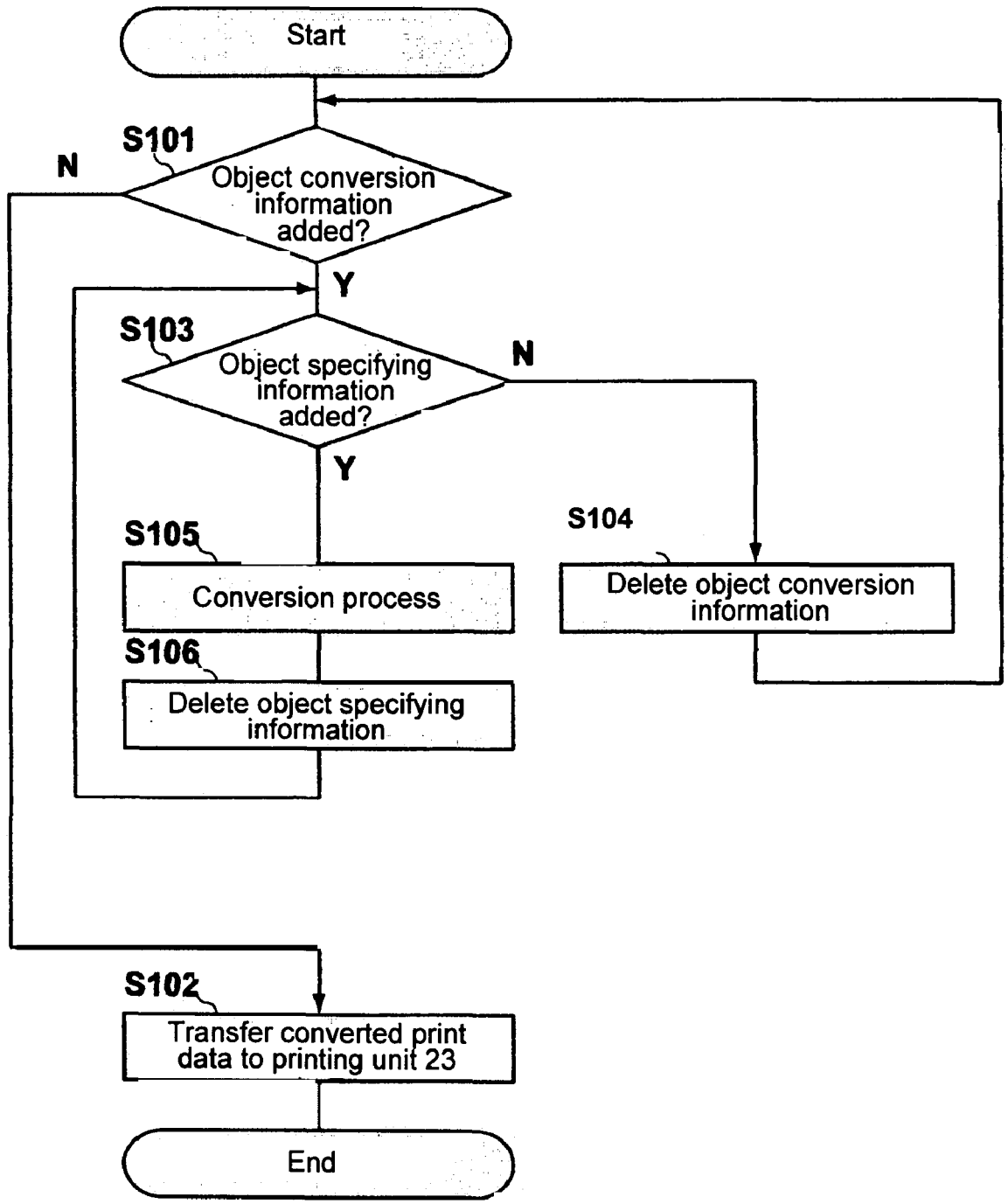
FIG. 13 is a flow chart showing an operation of a conversion unit according to the first embodiment of the present invention.

An operation of the conversion unit 22 will be explained next. FIG. 13 is a flow chart showing the operation of the conversion unit 22 according to the first embodiment of the present invention.

In step S101, the conversion unit 22 analyzes the combined print data to determine whether the object conversion information is added to the combined print data. In step S102, when the conversion unit 22 determines that the object conversion information is not added, the conversion unit 22 determines the completion of the conversion process, and transfers the converted print data to the printing unit 23.

In step S103, when the conversion unit 22 determines that the object conversion information is added, the conversion unit 22 analyzes the combined print data to determine whether the object specifying information of the drawing object to be converted is added to the combined print data.

In step S104, when the conversion unit 22 determines that the object specifying information is not added, the conversion unit 22 deletes the object conversion information from the combined print data. Then, the conversion unit 22 continues analyzing the combined print data to determine whether the object specifying information of other drawing object to be converted is added to the combined print data.

In step S105, when the conversion unit 22 determines that the object specifying information of the drawing object to be converted is added to the combined print data, the conversion unit 22 performs the conversion process on PDL of the drawing object indicated by the object specifying information according to the object conversion information. In step S106, the conversion unit 22 deletes the object specifying information of the drawing object thus converted from the combined print data.

As described above, the conversion unit 22 repeats the process described above until the object specifying information of the drawing object to be converted no longer exists. When it is determined that the object specifying information of the drawing object to be converted no longer exists, the conversion unit 22 deletes the object conversion information. Further, the conversion unit 22 analyzes the combined print data to determine whether the object conversion information of other drawing object is added to the combined print data.

As shown in FIG. 8, the combined print data includes the object specifying information 72 to 74 and the object conversion information 71 directing the monochrome conversion. As described above, the combined print data shown in FIG. 8 is transferred to the transmission unit 16. As a result, the converted print data shown in FIG. 9 is transferred to the printing unit 23. In the converted print data, PDLs of the drawing objects indicated by the object specifying information 72 to 74 are processed through the monochrome conversion.

As described above, in the image forming system in the embodiment, when the print data including the drawing object such as a text, a graphic, and an image is created, the object specifying information indicating the drawing object specified as the conversion subject is created, and the object conversion information directing the reduction in the toner consumption relative to the drawing object thus specified is created.

Further, the combined print data is created through adding the object specifying information and the object conversion information thus created to the print data. Then, the combined print data is converted to the converted print data according to the object specifying information and the object conversion information. Finally, the printing operation is performed according to the converted print data.

Accordingly, in the case that there is no information difference when the drawing object is printed in monochrome as opposed to in colors, it is possible to reduce color toner consumption. Further, in the case that there is no information difference when the drawing object is printed with reducing the size of the drawing object as opposed to before reducing the size, it is possible to reduce color toner consumption. Further, in the case that there is no information difference when the drawing object such as an image is printed with reduced image density as opposed to before reducing the density, it is possible to reduce color toner consumption.

Second Embodiment

Figure 14:
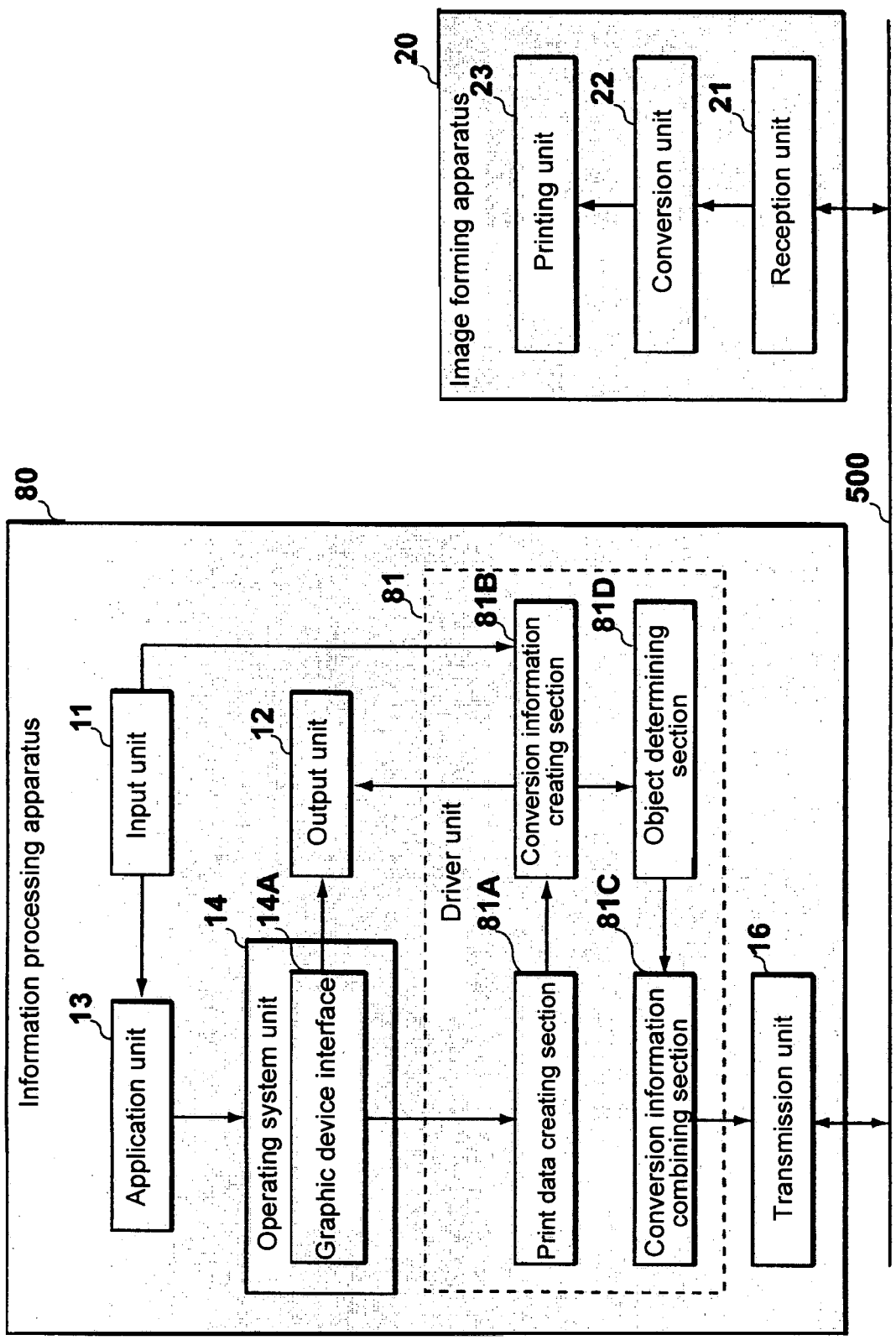
FIG. 14 is a block diagram showing a configuration of an image forming system according to a second embodiment of the present invention.

A second embodiment of the present invention will be explained next. FIG. 14 is a block diagram showing a configuration of an image forming system according to the second embodiment of the present invention.

As shown in FIG. 14, the image forming system includes an information processing apparatus 80; the network 500 (I/F cable); and the image forming apparatus 20. The information processing apparatus 80 is connected to the image forming apparatus 20 through the network 500 (I/F cable). The image forming apparatus 20 has a configuration same as that in the first embodiment.

In the embodiment, the information processing apparatus 80 includes a PC (Personal Computer) and the likes, and is formed of the input unit 11 such as a keyboard, a mouse, and the likes; the output unit 12 such as a liquid crystal display and the likes; the application unit 13; the operating system unit 14; a driver unit 81; and the transmission unit 16. In the second embodiment, the input unit 11, the output unit 12, the application unit 13, the operating system unit 14, and the transmission unit 16 have configurations same as those in the first embodiment.

In the embodiment, the driver unit 81 includes a print data creating section 81A, a conversion information creating section 81B, a conversion information combining section 81C, and an object determining section 81D. The print data creating section 81A creates the print data according to the drawing object data. When the print data creating section 81A receives the drawing object data, the print data creating section 81A creates the print data to be transmitted to the image forming apparatus 20 according to PDL (Page-Description Language).

In the embodiment, the conversion information creating section 81B directs the conversion of the drawing object described in PDL, and includes a memory (not shown) holding conversion setting screen data for conversion setting.

When the print data creating section 81A creates the print data, the conversion information creating section 81B temporarily stores the print data in a memory (not shown). Further, the conversion information creating section 81B transfers the conversion setting screen data in the memory to the output unit 12.

Figure 15:
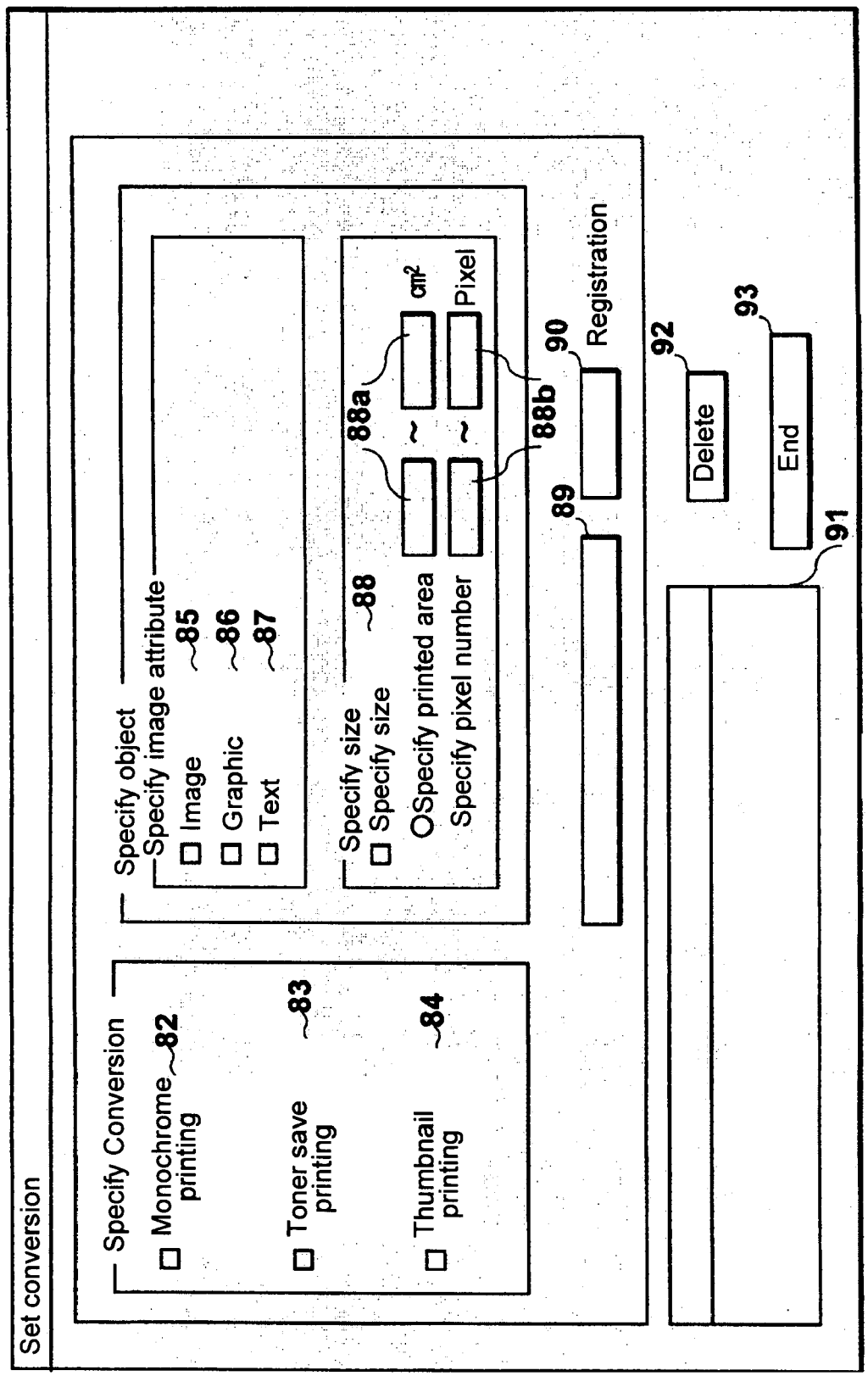
FIG. 15 is a schematic view showing an example No. 5 of a conversion setting screen according to the second embodiment of the present invention.

When the output unit 12 receives the conversion setting screen data, the output unit 12 displays a conversion setting screen according to the conversion setting screen data. FIG. 15 is a schematic view showing an example No. 5 of the conversion setting screen according to the second embodiment of the present invention.

As shown in FIG. 15, the conversion setting screen has a monochrome printing check box 82; a toner save printing check box 83; a thumbnail printing check box 84; am image attribute checking box 85; a graphic attribute checking box 86; a text attribute checking box 87; a size specifying checking box 88; an area setting box 88a; a pixel number setting box 88b; a condition name input box 89; a registration button 90; a registration condition list box 91; a delete button 92; and an end button 93.

Figure 16:
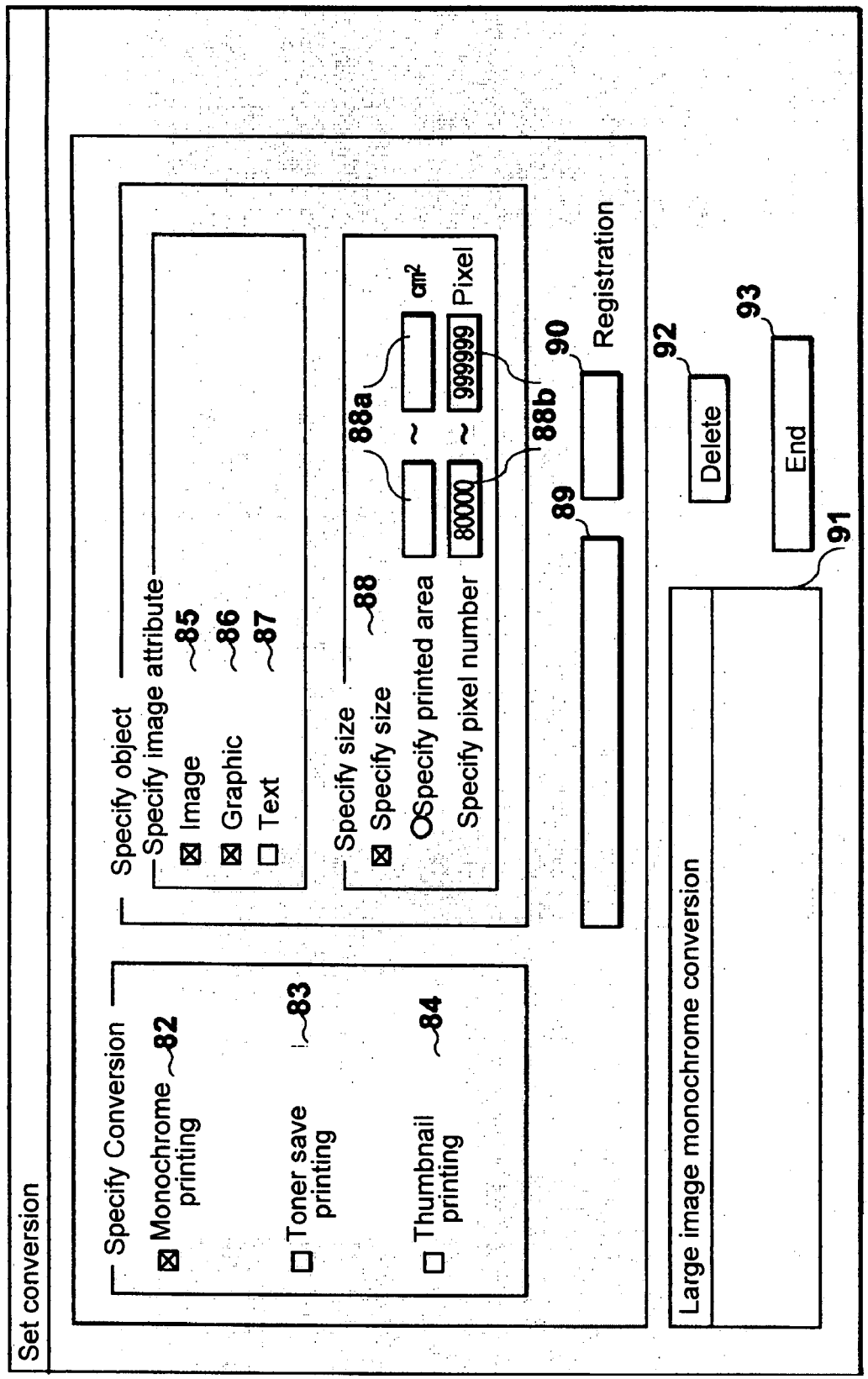
FIG. 16 is a schematic view showing an example No. 6 of the conversion setting screen according to the second embodiment of the present invention.

In the embodiment, the user specifies the drawing object to be converted using the image attribute checking box 85, the graphic attribute checking box 86, and the text attribute checking box 87. FIG. 16 is a schematic view showing an example No. 6 of the conversion setting screen according to the second embodiment of the present invention. In the example shown FIG. 16, the image attribute checking box 85 and the graphic attribute checking box 86 are checked.

In the embodiment, the user specifies the conversion of the drawing object thus specified using the monochrome printing check box 82, the toner save printing check box 83, and the thumbnail printing check box 84. In the example shown FIG. 16, the monochrome printing check box 82 is checked.

In the embodiment, the user directs that the drawing object to be converted is specified by a size using the size specifying checking box 88. The user specifies an area range (cm$^2$) of the drawing object to be converted using the area setting box 88a. Further, the user specifies a pixel number range of the drawing object to be converted using the pixel number setting box 88b. In the example shown FIG. 16, a pixel number range of 80,000 to 999,999 is input through the pixel number setting box 88b.

In the embodiment, the user inputs a registration name of conversion conditions using the condition name input box 89. The user directs using the registration button 90 that the conversion conditions are registered under the registration name input through the condition name input box 89. It is possible to display the conversion conditions thus registered in the registration condition list box 91.

The user looks at the conversion setting screen and specifies the conversion conditions of the drawing object. When the user inputs registration name data indicating the registration name of the conversion conditions in the condition name input box 89 and pushes the registration button 90, the conversion information creating section 81B creates conversion condition data indicating the conversion conditions thus set. Further, the conversion information creating section 81B correlates the registration name data and the conversion condition data, and holds in a memory (not shown), thereby completing a registration process.

At this time, the conversion information creating section 81B transfers the registration name data, the conversion condition data, and the conversion setting screen data in the memory to the output unit 12. When the output unit 12 receives the registration name data, the conversion condition data, and the conversion setting screen data, the output unit 12 displays the conversion setting screen in which the registration condition list box 91 is updated according to the registration name data, the conversion condition data, and the conversion setting screen data.

In the example shown in FIG. 16, the image attribute checking box 85, the graphic attribute checking box 86, and the monochrome printing check box 82 are checked as the conversion conditions of the drawing object. Further, the pixel number range of 80,000 to 999,999 is input in the pixel number setting box 88b. Further, "Large image monochrome conversion" is input in the condition name input box 89 as the registration name of the conversion conditions.

Accordingly, the conversion information creating section 81B creates the conversion condition data directing that the drawing object such as an image and a graphic in the pixel number range of 80,000 to 999,999 be processed through the monochrome conversion. Further, the conversion information creating section 81B correlates the registration name data indicating "Large image monochrome conversion" and the conversion condition data, and stores in the memory (not shown).

Further, the output unit 12 displays the conversion setting screen shown in FIG. 16, in which the registration name of the conversion conditions thus registered is displayed in the registration condition list box 91 to be selected. With the process described above, in the next operation, the user can select the registration name displayed in the registration condition list box 91 in the conversion setting screen without inputting the same conversion conditions again, thereby making it possible to quickly set the conversion conditions.

In the embodiment, the user pushes the delete button 92 to delete the conversion conditions thus registered. More specifically, the user looks at the registration condition list box 91 in the conversion setting screen and selects a registration name corresponding to an unnecessary conversion condition through the input unit 11. Then, when the user pushes the delete button 92, the conversion information creating section 81B deletes the conversion condition data from the memory according to the registration name data indicating the registration name thus selected.

In the embodiment, the user pushes the end button 93 to complete the conversion setting. More specifically, when the user looks at the conversion setting screen and pushes the end button 93, the conversion information creating section 81B transfers the conversion condition data in the memory to the object determining section 81D. In the example, the conversion condition data directs that the drawing object attributed to an image or a graphic in the pixel number range of 80,000 to 999,999 be processed through the monochrome conversion.

In the embodiment, the object determining section 81D identifies the drawing object corresponding to the conversion conditions from the drawing objects constituting the print data. When the object determining section 81D receives the conversion condition data, the object determining section 81D analyzes the print data in the memory, and identifies the drawing object corresponding to the conversion conditions specified in the conversion condition data as the drawing object to be converted. In the example, the object determining section 81D identifies the drawing object attributed to an image or a graphic in the pixel number range of 80,000 to 999,999.

In the embodiment, the conversion information combining section 81C combines the object specifying information and the object conversion information to the print data to create the combined print data. More specifically, the conversion information combining section 81C adds the object specifying information specifying the drawing object identified by the object determining section 81D and the object conversion information according to the conversion condition data to the print data. In the example, the object conversion information directing the monochrome conversion is added to the print data.

When the conversion information combining section 81C creates the combined print data, in which the object conversion information for converting the drawing object to be converted is added to the print data, the conversion information combining section 81C transfers the combined print data to the transmission unit 16. When the transmission unit 16 receives the combined print data, the transmission unit 16 sends the combined paint data to the image forming apparatus 20, so that the image forming apparatus 20 performs the printing operation according to the combined print data similarly to the first embodiment.

Figure 17:
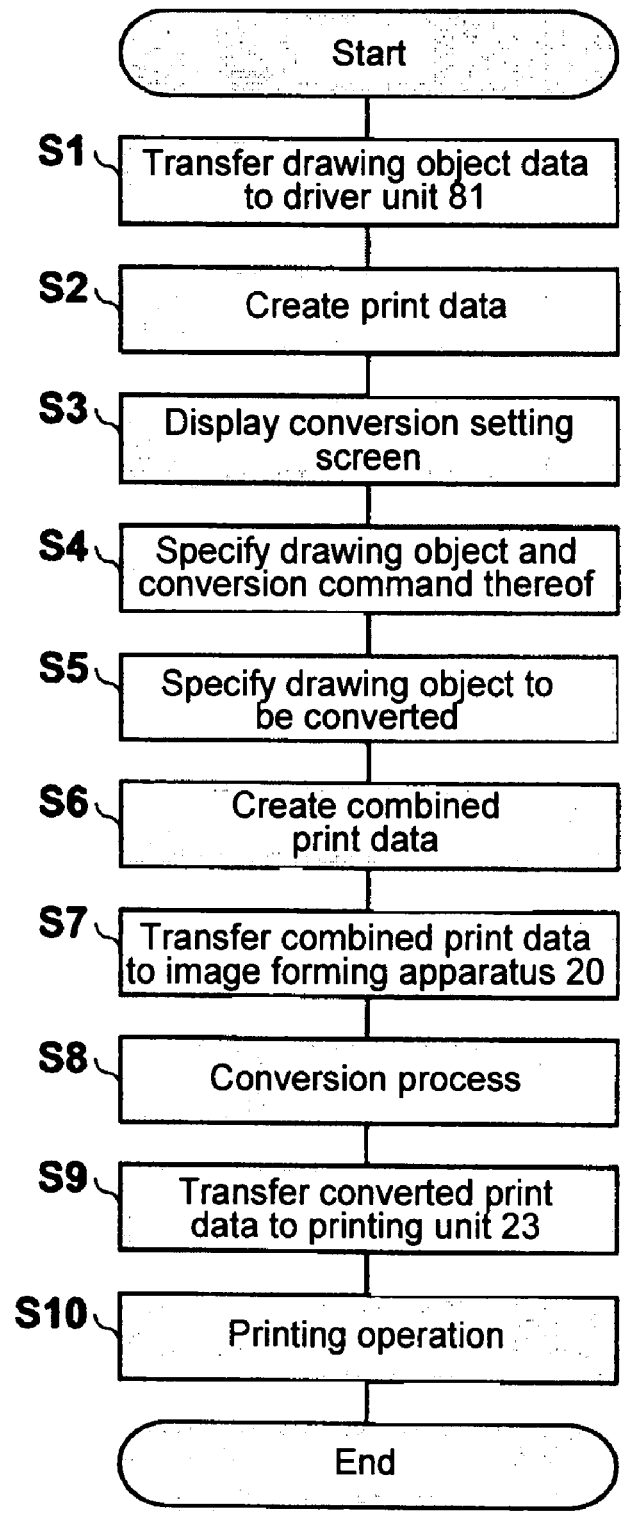
FIG. 17 is a flow chart showing an operation of the image forming system according to the second embodiment of the present invention.

An operation of the image forming system in the second embodiment will be explained next. FIG. 17 is a flow chart showing the operation of the image forming system according to the second embodiment of the present invention.

In step S1, similar to the first embodiment, the application unit 13 creates the drawing object data, and the drawing object data is transferred to the print data creating section 81A through the operating system unit 14.

In step S2, when the print data creating section 81A receives the drawing object data, the print data creating section 81A creates the print data to be transmitted to the image forming apparatus 20 according to the drawing object data (FIG. 2) through PDL (Page-Description Language).

When the print data creating section 81A creates the print data, the conversion information creating section 81B temporarily stores the print data in the memory (not shown). Further, the conversion information creating section 81B transfers the conversion setting screen data in the memory to the output unit 12.

In step S3, when the output unit 12 receives the conversion setting screen data, the output unit 12 displays the conversion setting screen according to the conversion setting screen data. Accordingly, the conversion setting screen shown in FIG. 16 is displayed.

In step S4, the user looks at the conversion setting screen and specifies the conversion conditions of the drawing object through the input unit 11. Accordingly, as shown in FIG. 16, the image attribute checking box 85, the graphic attribute checking box 86, and the monochrome printing check box 82 are checked as the conversion conditions of the drawing object. Further, the pixel number range of 80,000 to 999,999 is input in the pixel number setting box 88*b*.

When the user inputs the registration name data indicating the registration name of the conversion conditions in the condition name input box 89 and pushes the registration button 90, the conversion information creating section 81B creates the conversion condition data indicating the conversion conditions thus set. Further, the conversion information creating section 81B correlates the registration name data and the conversion condition data, and holds in the memory (not shown), thereby completing the registration process.

At this time, the conversion information creating section 81B transfers the registration name data, the conversion condition data, and the conversion setting screen data in the memory to the output unit 12. When the output unit 12 receives the registration name data, the conversion condition data, and the conversion setting screen data, the output unit 12 displays the conversion setting screen in which the registration condition list box 91 is updated according to the registration name data, the conversion condition data, and the conversion setting screen data.

When the user pushes the end button 93 through the input unit 11, the conversion information creating section 81B transfers the conversion condition data in the memory to the object determining section 81D. In the example, the conversion condition data directs that the drawing object attributed to an image or a graphic in the pixel number range of 80,000 to 999,999 be processed through the monochrome conversion.

In step S5, when the object determining section 81D receives the conversion condition data, the object determining section 81D analyzes the print data in the memory, and identifies the drawing object corresponding to the conversion conditions specified in the conversion condition data as the drawing object to be converted. In the example, the object determining section 81D identifies the drawing object attributed to an image or a graphic in the pixel number range of 80,000 to 999,999.

In step S6, the conversion information combining section 81C combines the object specifying information and the object conversion information to the print data to create the combined print data. More specifically, the conversion information combining section 81C adds the object specifying information specifying the drawing object identified by the object determining section 81D and the object conversion information according to the conversion condition data to the print data. In the example, the object conversion information directing the monochrome conversion is added to the print data.

When the conversion information combining section 81C creates the combined print data, in which the object conversion information for converting the drawing object to be converted is added to the print data, the conversion information combining section 81C transfers the combined print data to the transmission unit 16.

In step S7, when the transmission unit 16 receives the combined print data, the transmission unit 16 sends the combined paint data to the image forming apparatus 20.

In step S8 to step S10, the image forming apparatus 20 performs the printing operation according to the combined print data similarly to the first embodiment.

As described above, in the image forming system in the embodiment, when the print data including the drawing object such as a text, a graphic, and an image is created, the object specifying information indicating the drawing object specified as the conversion subject is created, and the object conversion information directing the reduction in the toner consumption relative to the drawing object thus specified is created.

Further, the combined print data is created through adding the object specifying information and the object conversion information thus created to the print data. Then, the combined print data is converted to the converted print data according to the object specifying information and the object conversion information. Finally, the printing operation is performed according to the converted print data.

Accordingly, in the case that there is no information difference when the drawing object is printed in monochrome as opposed to in colors, it is possible to reduce color toner consumption. Further, in the case that there is no information difference when the drawing object is printed with reducing the size of the drawing object as opposed to before reducing the size, it is possible to reduce color toner consumption. Further, in the case that there is no information difference when the drawing object such as an image is printed with reduced image density as opposed to before reducing the density, it is possible to reduce color toner consumption.

Further, the conversion condition data indicating the conversion conditions thus specified is registered corresponding to the registration name, and the registration name thus registered is displayed in the registration condition list box 91 of the conversion setting screen to be selected. Accordingly, in the next operation, the user can select the registration name displayed in the registration condition list box 91 in the conversion setting screen without inputting the same conversion conditions again, thereby making it possible to quickly set the conversion conditions.

Third Embodiment

Figure 18:
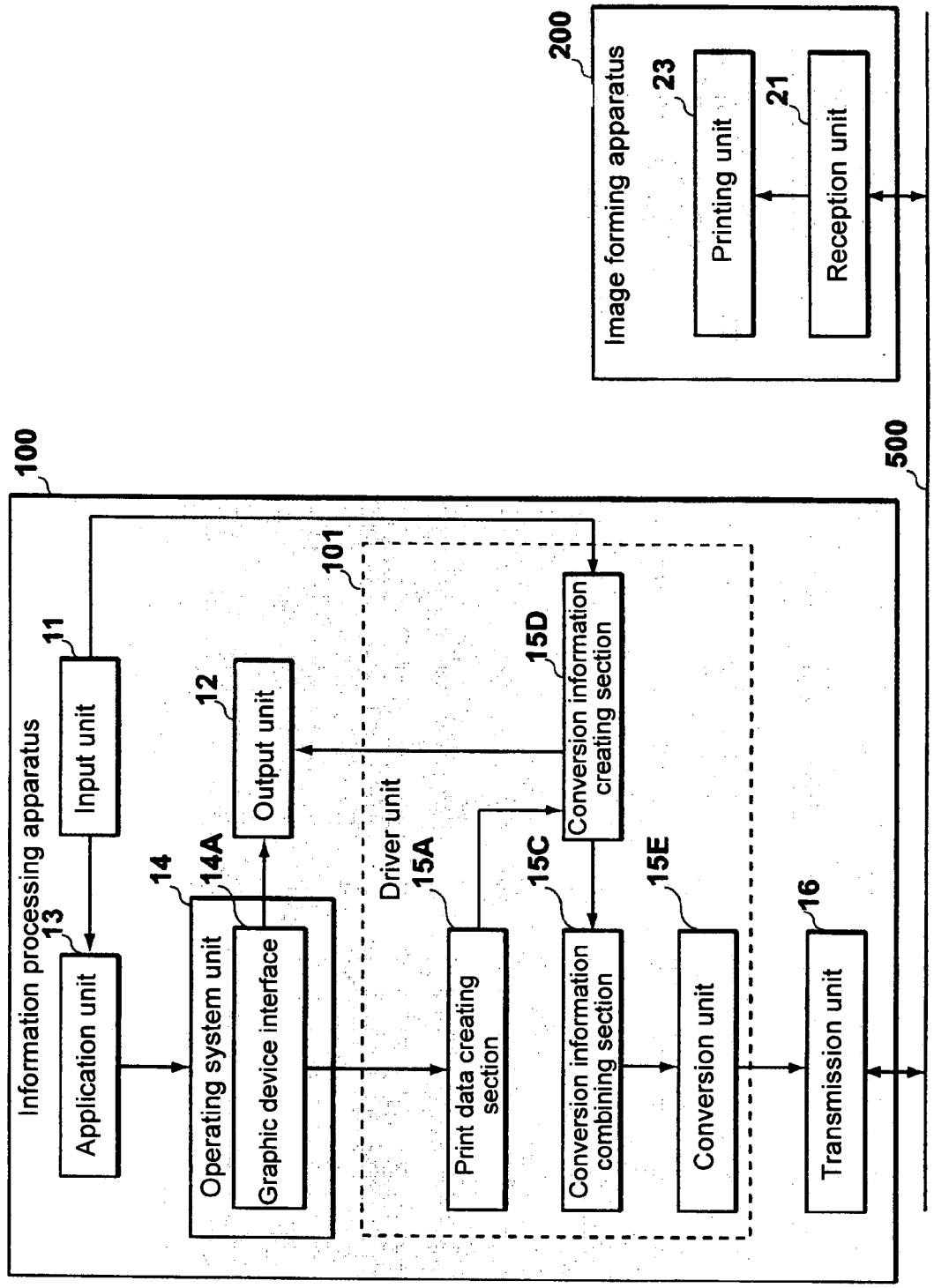
FIG. 18 is a block diagram showing a configuration of an image forming system according to a third embodiment of the present invention.

A third embodiment of the present invention will be explained next. FIG. 18 is a block diagram showing a configuration of an image forming system according to the third embodiment of the present invention.

As shown in FIG. 18, the image forming system includes an information processing apparatus 100; the network 500 (I/F cable); and an image forming apparatus 200. The information processing apparatus 100 is connected to the image forming apparatus 200 through the network 500 (I/F cable).

In the embodiment, the information processing apparatus 100 includes a PC (Personal Computer) and the likes, and is formed of the input unit 11 such as a keyboard, a mouse, and the likes; the output unit 12 such as a liquid crystal display and the likes; the application unit 13; the operating system unit 14; a driver unit 101; and the transmission unit 16. In the third embodiment, the input unit 11, the output unit 12, the application unit 13, the operating system unit 14, and the transmission unit 16 have configurations same as those in the first embodiment.

In the embodiment, the driver unit 101 includes the print data creating section 15A, a conversion information creating section 15D, the conversion information combining section 15C, and a conversion unit 15E. The print data creating section 15A and the conversion information combining section 15C are similar to those in the first embodiment.

Similar to the first embodiment, after completing the conversion setting of the drawing object, when the user pushes the end button 40 of the conversion setting screen through the input unit 11, the conversion information creating section 15D detects that the conversion setting is completed. Then, the conversion information creating section 15D transfers the combined print data in the memory to the conversion unit 15E, and sends the completion command signal to the output unit 12, so that the conversion setting screen is terminated. Upon receiving the completion command signal, the output unit 12 stops displaying the conversion setting screen.

In the embodiment, when the conversion unit 15E receives the combined print data, the conversion unit 15E performs the conversion process of the combined print data to create the converted print data according to the object specifying information and the object conversion information added to the combined print data.

More specifically, similar to the conversion unit 22 in the first embodiment, the conversion unit 15E analyzes the combined print data to determine whether the object conversion information is added to the combined print data. When the conversion unit 15E determines that the object conversion information is not added, the conversion unit 15E determines the completion of the conversion process, and transfers the converted print data to the transmission unit 16.

When the conversion unit 15E determines that the object conversion information is added, the conversion unit 15E analyzes the combined print data to determine whether the object specifying information of the drawing object to be converted is added to the combined print data. When the conversion unit 15E determines that the object specifying information is not added, the conversion unit 15E deletes the object conversion information from the combined print data. Then, the conversion unit 15E continues analyzing the combined print data to determine whether the object specifying information of other drawing object to be converted is added to the combined print data.

When the conversion unit 15E determines that the object specifying information of the drawing object to be converted is added to the combined print data, the conversion unit 15E performs the conversion process on PDL of the drawing object indicated by the object specifying information according to the object conversion information. Further, the conversion unit 15E deletes the object specifying information of the drawing object thus converted from the combined print data.

The conversion unit 15E repeats the process described above until the object specifying information of the drawing object to be converted no longer exists. When it is determined that the object specifying information of the drawing object to be converted no longer exists, the conversion unit 15E deletes the object conversion information. Further, the conversion unit 15E analyzes the combined print data to determine whether the object conversion information of other drawing object is added to the combined print data.

For example, when the object specifying information and the object conversion information directing the toner save printing are added to the print data, the converted print data, in which PDL of the drawing object specified by the object specifying information is processed through the density reduction conversion, is transferred to the transmission unit 16. Alternatively, when the object specifying information and the object conversion information directing the thumbnail printing are added to the print data, the converted print data, in which PDL of the drawing object specified by the object specifying information is processed through the reduction conversion, is transferred to the transmission unit 16.

In the embodiment, when the transmission unit 16 receives the converted print data, the transmission unit 16 sends the converted print data to the image forming apparatus 200 similar to the first embodiment. The image forming apparatus 200 includes a printer and the likes for performing the printing operation according to the converted print data, and includes the reception unit 21 and the printing unit 23.

In the embodiment, when the reception unit 21 receives the converted print data, the reception unit 21 transfers the converted print data to the printing unit 23. When the printing unit 23 receives the converted print data, the printing unit 23 performs the printing operation according to the converted print data.

As described above, in the embodiment, the drawing object is specified through the conversion setting screen, in which there is no information difference when the drawing object is printed in colors or in monochrome, from the drawing objects in the print data. Then, the converted print data, in which the drawing object thus specified is processed through the monochrome conversion, is transferred to the printing unit 23, thereby performing the printing operation. Accordingly, it is possible to reduce color toner consumption.

Further, the drawing object is specified, in which there is no information difference when the drawing object is printed in the toner save printing or the full toner printing, from the drawing objects in the print data. Then, the converted print data, in which the drawing object thus specified is processed through the density reduction conversion, is transferred to the printing unit 23, thereby performing the printing operation. Accordingly, it is possible to reduce color toner consumption.

Further, the drawing object is specified, in which there is no information difference when the drawing object is printed with or without reducing the size of the drawing object, from the drawing objects in the print data. Then, the converted print data, in which the drawing object thus specified is processed through the reduction conversion, is transferred to the printing unit 23, thereby performing the printing operation, in which the drawing object is printed in the reduced size. Accordingly, it is possible to reduce color toner consumption.

Further, the information processing apparatus 100 with high processing capability processes the conversion of the drawing object thus specified. Accordingly, even if the image forming apparatus 200 has low processing capacity, it is possible to efficiently perform the printing operation.

Figure 19:
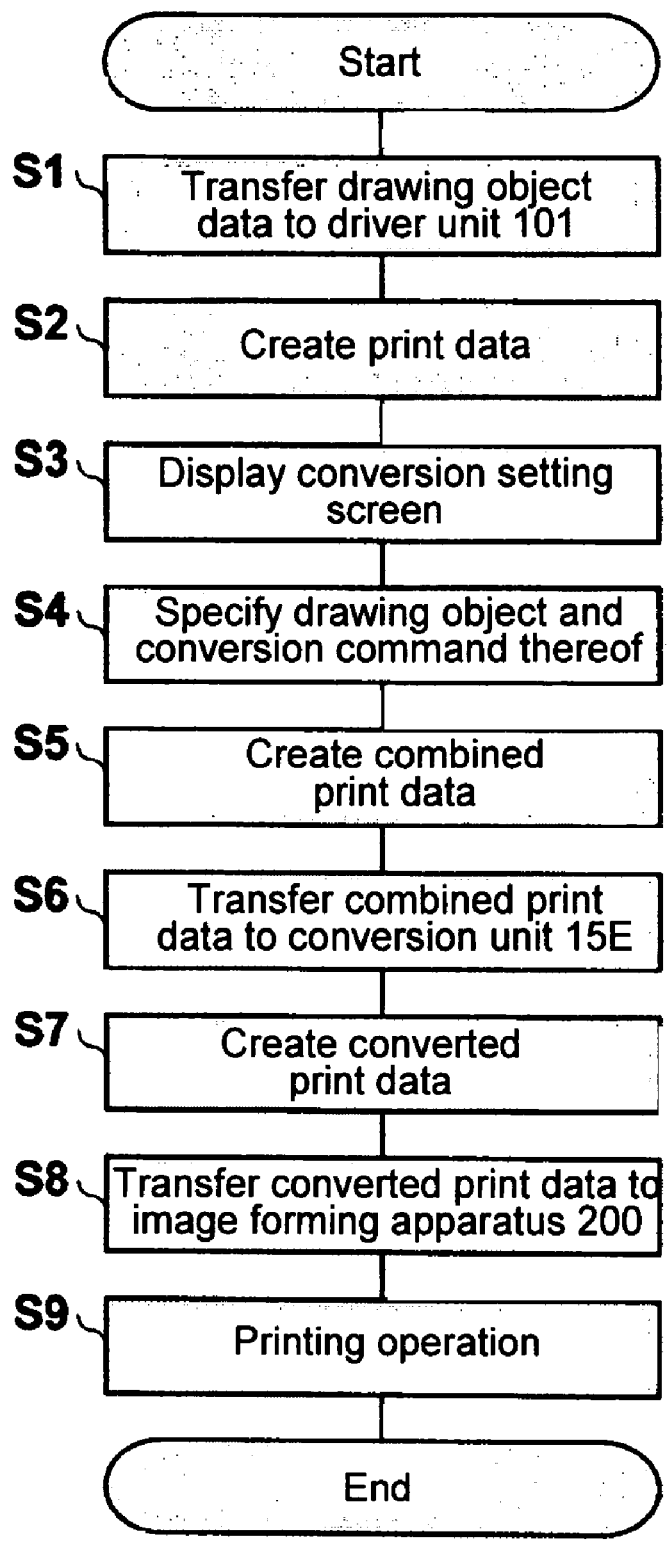
FIG. 19 is a flow chart showing an operation of the image forming system according to the third embodiment of the present invention.

An operation of the image forming system in the third embodiment will be explained next. FIG. 19 is a flow chart showing the operation of the image forming system according to the third embodiment of the present invention.

In step S6, similar to the first embodiment, after completing the conversion setting of the drawing object, when the user pushes the end button 40 of the conversion setting screen through the input unit 11, the conversion information creating section 15D detects that the conversion setting is completed. Then, the conversion information creating section 15D transfers the combined print data in the memory to the conversion unit 15E, and sends the completion command signal to the output unit 12, so that the conversion setting screen is terminated. Upon receiving the completion command signal, the output unit 12 stops displaying the conversion setting screen.

In step S7, when the conversion unit 15E receives the combined print data, the conversion unit 15E performs the conversion process of the combined print data to create the converted print data according to the object specifying information and the object conversion information added to the combined print data.

More specifically, similar to the conversion unit 22 in the first embodiment, the conversion unit 15E analyzes the combined print data to determine whether the object conversion information is added to the combined print data. When the conversion unit 15E determines that the object conversion information is not added, the conversion unit 15E determines the completion of the conversion process, and transfers the converted print data to the transmission unit 16.

When the conversion unit 15E determines that the object conversion information is added, the conversion unit 15E analyzes the combined print data to determine whether the object specifying information of the drawing object to be converted is added to the combined print data. When the conversion unit 15E determines that the object specifying information is not added, the conversion unit 15E deletes the object conversion information from the combined print data. Then, the conversion unit 15E continues analyzing the combined print data to determine whether the object specifying information of other drawing object to be converted is added to the combined print data.

When the conversion unit 15E determines that the object specifying information of the drawing object to be converted is added to the combined print data, the conversion unit 15E performs the conversion process on PDL of the drawing object indicated by the object specifying information according to the object conversion information. Further, the conversion unit 15E deletes the object specifying information of the drawing object thus converted from the combined print data.

The conversion unit 15E repeats the process described above until the object specifying information of the drawing object to be converted no longer exists. When it is determined that the object specifying information of the drawing object to be converted no longer exists, the conversion unit 15E deletes the object conversion information. Further, the conversion unit 15E analyzes the combined print data to determine whether the object conversion information of other drawing object is added to the combined print data.

In step S8, when the transmission unit 16 receives the converted print data, the transmission unit 16 sends the converted print data to the image forming apparatus 200 similar to the first embodiment. When the reception unit 21 of the image forming apparatus 200 receives the converted print data, the reception unit 21 transfers the converted print data to the printing unit 23. In step S9, when the printing unit 23 receives the converted print data, the printing unit 23 performs the printing operation according to the converted print data.

As described above, in the embodiment, the information processing apparatus 100 creates the print data including the drawing object such as a text, a graphic, or an image. Afterward, the object specifying information indicating the drawing object specified as the conversion subject is created, and the object conversion information directing the reduction in the toner consumption relative to the drawing object thus specified is created.

Further, the combined print data is created through adding the object specifying information and the object conversion information thus created to the print data. Then, the combined print data is converted to the converted print data according to the object specifying information and the object conversion information. Finally, the image forming apparatus 200 performs the printing operation according to the converted print data.

Accordingly, without depending on the processing performance of the image forming apparatus 200, in the case that there is no information difference when the drawing object is printed in monochrome as opposed to in colors, it is possible to quickly perform the printing operation while reducing color toner consumption. Further, in the case that there is no information difference when the drawing object is printed with reducing the size of the drawing object as opposed to without reducing the size, it is possible to quickly perform the printing operation while reducing color toner consumption. Further, in the case that there is no information difference when the drawing object such as an image is printed with reduced image density as opposed to before reducing the density, it is possible to quickly perform the printing operation while reducing color toner consumption.

Fourth Embodiment

Figure 20:
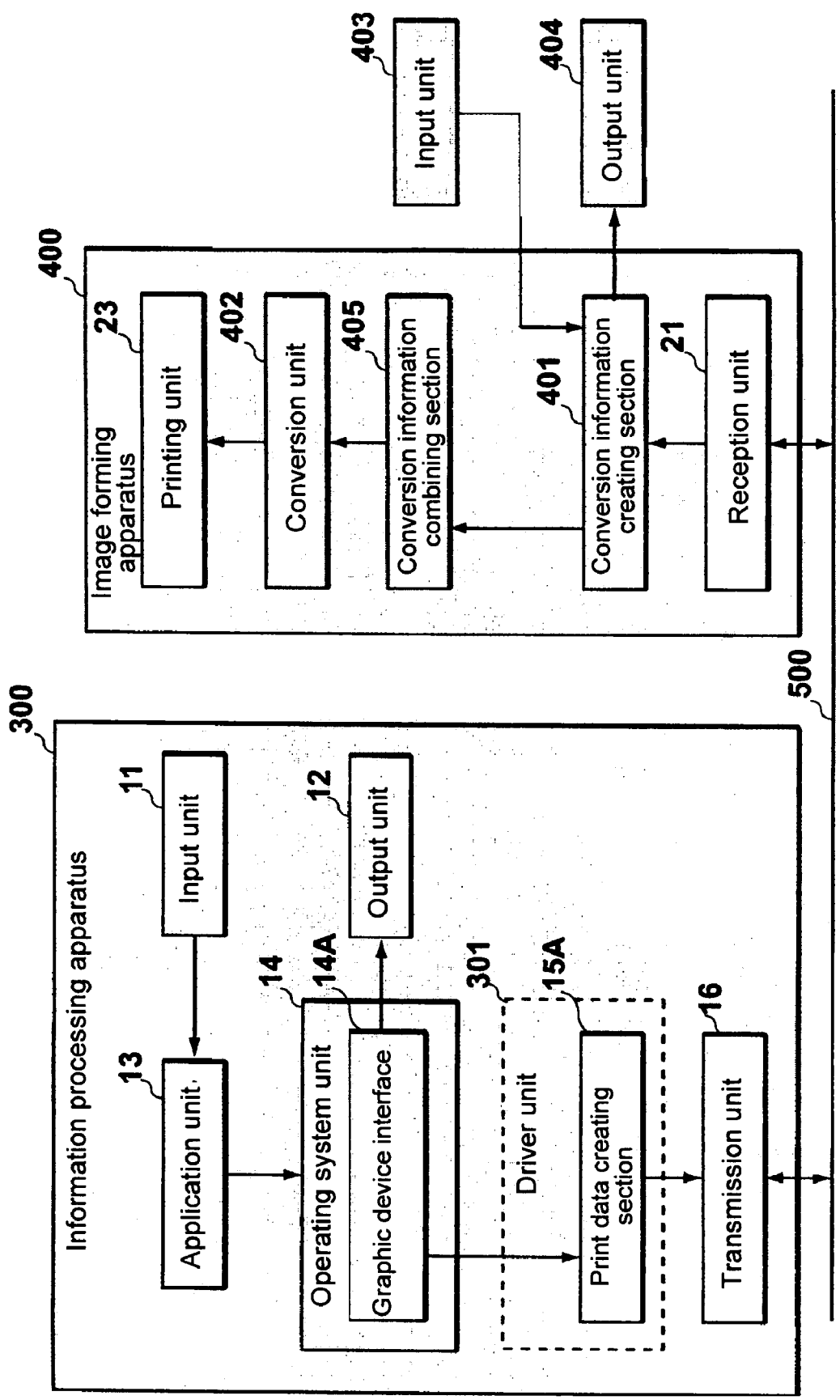
FIG. 20 is a block diagram showing a configuration of an image forming system according to a fourth embodiment of the present invention.

A fourth embodiment of the present invention will be explained next. FIG. 20 is a block diagram showing a configuration of an image forming system according to the fourth embodiment of the present invention.

As shown in FIG. 20, the image forming system includes an information processing apparatus 300; the network 500 (I/F cable); and an image forming apparatus 400. The information processing apparatus 100 is connected to the image forming apparatus 200 through the network 500 (I/F cable).

In the embodiment, the information processing apparatus 300 includes a PC (Personal Computer) and the likes, and is formed of the input unit 11 such as a keyboard, a mouse, and the likes; the output unit 12 such as a liquid crystal display and the likes; the application unit 13; the operating system unit 14; a driver unit 301; and the transmission unit 16. In the fourth embodiment, the input unit 11, the output unit 12, the application unit 13, the operating system unit 14, and the transmission unit 16 have configurations same as those in the first embodiment.

In the embodiment, the driver unit 301 includes the print data creating section 15A. Similar to the first embodiment, when the print data creating section 15A receives the drawing object data, the print data creating section 15A creates the print data to be transmitted to the image forming apparatus 400 according to PDL (Page-Description Language), so that the print data creating section 15A transmits the print data thus created to the image forming apparatus 400 through the transmission unit 16.

In the embodiment, the image forming apparatus 400 includes a printer and the likes for performing the printing operation according to the print data, and includes the reception unit 21; the printing unit 23; an input unit 403 such as a keyboard and the likes; an output unit 404 such as a liquid crystal display; a conversion information creating section 401; a conversion information combining section 405; and a conversion unit 402.

In the embodiment, when the reception unit 21 receives the print data from the information processing apparatus 300, the reception unit 21 transfers the print data to the conversion information creating section 401. The conversion information creating section 401 directs the conversion of the drawing object described in PDL, and includes a memory (not shown) holding the conversion setting screen data for the conversion setting.

When the conversion information creating section 401 receives the print data, the conversion information creating section 401 temporarily stores the print data in a memory (not shown). Further, the conversion information creating section 401 creates the print image data for displaying the preview per page according to the print data thus created. Then, the conversion information creating section 401 transfers the print image data of the first page and the conversion setting screen data in the memory to the output unit 404. At this moment, the conversion information creating section 401 temporarily stores the print image data of the pages other than the first page in a memory (not shown).

When the output unit 404 receives the print image data and the conversion setting screen data, the output unit 404 displays the conversion setting screen. For example, similar to the first embodiment, the output unit 404 displays the conversion setting screen as shown in FIG. 4.

When the user pushes the end button 40 through the input unit 403 similar to the first embodiment, the conversion information creating section 401 detects that the conversion setting is completed. Then, the conversion information creating section 401 transfers the combined print data in the memory to the conversion unit 402, and sends the completion command signal to the output unit 404, so that the conversion setting screen is terminated. Upon receiving the completion command signal, the output unit 404 stops displaying the conversion setting screen.

In the embodiment, when the conversion unit 402 receives the combined print data, similar to the conversion unit 22 in the first embodiment, the conversion unit 402 performs the conversion process of the combined print data to create the converted print data according to the object specifying information and the object conversion information added to the combined print data. After the conversion process is completed, the conversion unit 402 transfers the converted print data to the printing unit 23. When the printing unit 23 receives the converted print data, the printing unit 23 performs the printing operation according to the converted print data.

Figure 21:
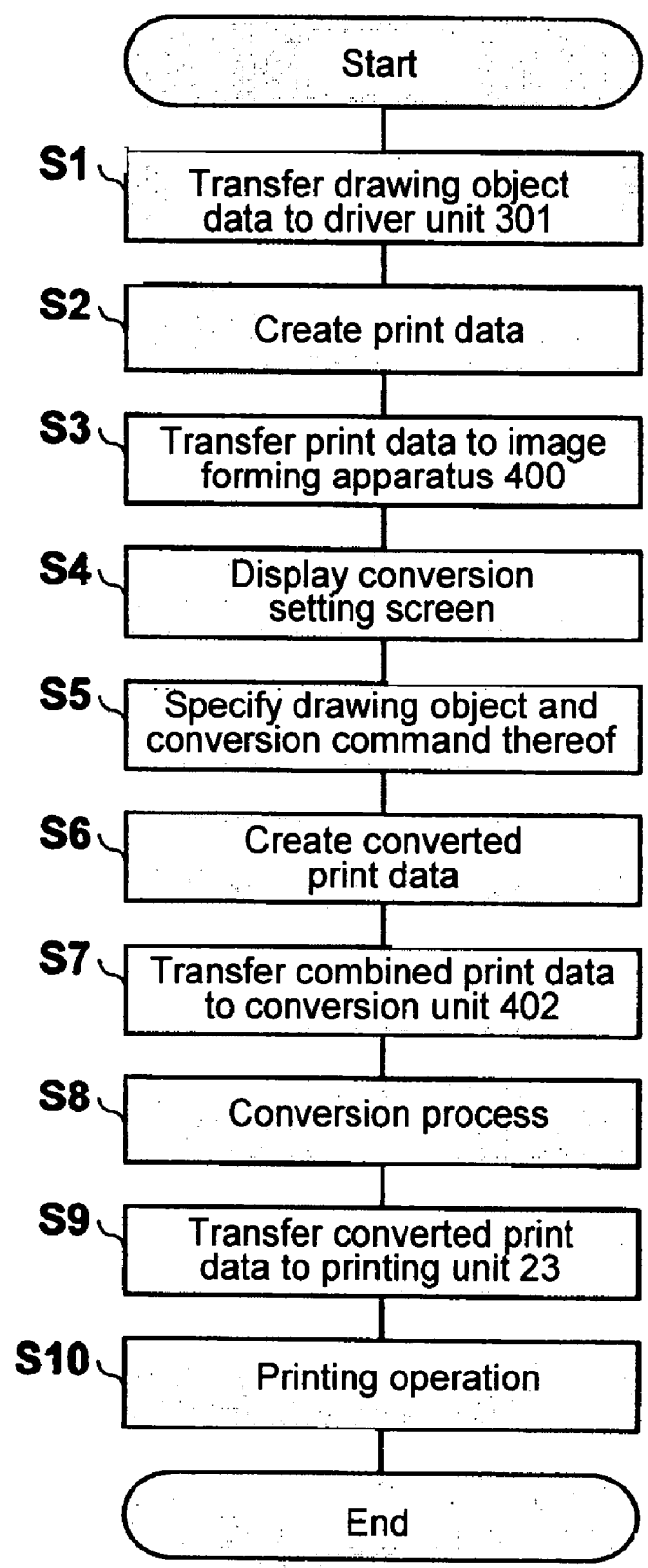
FIG. 21 is a flow chart showing an operation of the image forming system according to the fourth embodiment of the present invention.

An operation of the image forming system in the fourth embodiment will be explained next. FIG. 21 is a flow chart showing the operation of the image forming system according to the fourth embodiment of the present invention.

Similar to the first embodiment, when the print data creating section 15A of the preview displaying area 301 receives the drawing object data, the print data creating section 15A creates the print data to be transmitted to the image forming apparatus 400 according to the drawing object data through PDL (Page-Description Language).

In step S3, the print data creating section 15A transfers the print data thus created to the image forming apparatus 400.

When the conversion information creating section 401 receives the print data, the conversion information creating section 401 temporarily stores the print data in the memory (not shown). Further, the conversion information creating section 401 creates the print image data for displaying the preview per page according to the print data thus created. Then, the conversion information creating section 401 transfers the print image data of the first page and the conversion setting screen data in the memory to the output unit 404. At this moment, the conversion information creating section 401 temporarily stores the print image data of the pages other than the first page in the memory (not shown).

In step S4, when the output unit 404 receives the print image data and the conversion setting screen data, the output unit 404 displays the conversion setting screen. For example, similar to the first embodiment, the output unit 404 displays the conversion setting screen as shown in FIG. 4.

In step S5 to S6, the process proceeds similar to the first embodiment. In step S7, when the user pushes the end button 40 through the input unit 403, the conversion information creating section 401 detects that the conversion setting is completed. Then, the conversion information creating section 401 transfers the combined print data in the memory to the conversion unit 402, and sends the completion command signal to the output unit 404, so that the conversion setting screen is terminated. Upon receiving the completion command signal, the output unit 404 stops displaying the conversion setting screen.

In step S8, when the conversion unit 402 receives the combined print data, similar to the conversion unit 22 in the first embodiment, the conversion unit 402 performs the conversion process of the combined print data according to the object specifying information and the object conversion information added to the combined print data.

In step S9, after the conversion process is completed, the conversion unit 402 transfers the converted print data to the printing unit 23. In step S10, when the printing unit 23 receives the converted print data, the printing unit 23 performs the printing operation according to the converted print data.

As described above, in the embodiment, when the image forming apparatus 400 receives the print data including the drawing object such as a text, a graphic, or an image, the image forming apparatus 400 creates the object specifying information indicating the drawing object specified as the conversion subject and the object conversion information directing the reduction in the toner consumption relative to the drawing object thus specified.

Further, the combined print data is created through adding the object specifying information and the object conversion information thus created to the print data. Then, the combined print data is converted to the converted print data according to the object specifying information and the object conversion information. Finally, the image forming apparatus 400 performs the printing operation according to the converted print data.

Accordingly, without depending on the processing performance of the information processing apparatus 300, in the case that there is no information difference when the drawing object is printed in monochrome as opposed to in colors, it is possible to quickly perform the printing operation while reducing color toner consumption. Further, in the case that there is no information difference when the drawing object is printed with reducing the size of the drawing object as opposed to without reducing the size, it is possible to quickly perform the printing operation while reducing color toner consumption. Further, in the case that there is no information difference when the drawing object such as an image is printed with reduced image density as opposed to before reducing the density, it is possible to quickly perform the printing operation while reducing color toner consumption.

The disclosure of Japanese Patent Application No. 2006-100675, filed on Mar. 31, 2006, is incorporated in the application.

While the invention has been explained with reference to the specific embodiments of the invention, the explanation is illustrative and the invention is limited only by the appended claims.

What is claimed is:

1. An information processing apparatus, comprising:
an application unit for obtaining image data including a plurality of drawing objects;
a driver unit for determining one of the drawing objects to be a first object that is subject to consumption reduction of developer and another of the drawing objects to be a second object that is not subject to the consumption reduction of developer according to a specifying instruction from an input unit, and for setting information related to the consumption reduction of developer according to the one of the drawing objects, said driver unit being arranged to be capable of individually specifying the first object and the second object among the drawing objects having a same type, said same type including at least one of a text, a graphic, and an image object; and
an output unit outputting the drawing objects and the information related to the consumption reduction of developer.

2. The information processing apparatus according to claim 1, wherein said driver unit is arranged to create object specifying information specifying the one of the drawing objects and the information related to the consumption reduction of developer, and to create combined image data through adding the object specifying information and the information related to the consumption reduction to the image data, said driver unit being arranged to output the combined image data.

3. The information processing apparatus according to claim 1, further comprising a registration unit for correlating the object specifying information and the developer reduction information to generate conversion condition data, and for registering the conversion condition data to a list, and a selection unit for selecting the conversion condition data from the list, said driver unit being arranged to create the combined print data through adding the object specifying information and the developer reduction information contained in the conversion condition data thus selected.

4. The information processing apparatus according to claim 1, wherein said driver is arranged to create the object specifying information specifying a group of the drawing objects, and creates object conversion information relative to the group of the drawing objects.

5. The information processing apparatus according to claim 1, wherein said driver is arranged to create conversion condition data relative to the drawing object for reducing toner consumption.

6. The information processing apparatus according to claim 5, further comprising an object determining unit for analyzing the print data according to the conversion condition data to identify the drawing object.

7. An image forming system, comprising
an information processing apparatus; and
an image forming apparatus,
wherein said information processing apparatus includes:
an application unit for obtaining image data including a plurality of drawing objects;

a driver unit for determining one of the drawing objects to be a first object that is subject to consumption reduction of developer and another of the drawing objects to be a second object that is not subject to the consumption reduction of developer according to a specifying instruction from an input unit, and for setting information related to the consumption reduction of developer according to the one of the drawing objects, said driver unit being arranged to be capable of individually specifying the first object and the second object among the drawing objects having a same type, said same type including at least one of a text, graphic, and an image object; and an output unit for outputting the drawing objects and the information related to the consumption reduction of developer, said image forming apparatus includes:

an information obtaining unit for obtaining object specifying information specifying the one of the drawing objects and object conversion information directing a conversion process relative to the one of the drawing objects;

a conversion unit for converting the image data to print data according to the object specifying information and the object conversion information; and a printing unit for performing a printing operation according to the print data.

8. The image forming system according to claim 7, wherein said conversion unit is arranged to create the print data through a monochrome conversion process.

9. The image forming system according to claim 7, wherein said conversion unit is arranged to create the print data through a density reduction conversion process.

10. The image forming system according to claim 7, wherein said conversion unit is arranged to create the print data through a reduction conversion process.

11. An image forming apparatus, comprising:

a reception unit for receiving object specifying information determining one of drawing objects to be a first object that is subject to consumption reduction of developer and another of the drawing objects to be a second object that is not subject to the consumption reduction of developer among a plurality of drawing objects having a same type, object conversion information directing a conversion process relative to the one of the drawing objects, and print data including the one of the drawing objects and information related to consumption reduction of developer according to the one of the drawing objects, said same type including at least one of a text, a graphic, and an image object;

an information obtaining unit for obtaining the object specifying information and the object conversion information;

a conversion unit for converting the print data to converted print data according to the object specifying information and the object conversion information; and a printing unit for performing a printing operation according to the converted print data.

* * * * *